(12) United States Patent
Wylie et al.

(10) Patent No.: US 7,619,991 B2
(45) Date of Patent: Nov. 17, 2009

(54) USER INTERFACE FOR MODELING ESTIMATIONS OF RESOURCE PROVISIONING

(75) Inventors: Philip Wylie, Downpatrick (GB); Mark Wusthoff, Carrickfergus (GB); Andrew Jackson, County Antrim (GB)

(73) Assignee: SAP AG, Walldorf (DE)

( * ) Notice: Subject to any disclaimer, the term of this patent is extended or adjusted under 35 U.S.C. 154(b) by 332 days.

(21) Appl. No.: 11/731,187

(22) Filed: Mar. 30, 2007

(65) Prior Publication Data

US 2008/0240119 A1 Oct. 2, 2008

(51) Int. Cl.
H04L 12/28 (2006.01)
(52) U.S. Cl. .................. 370/254; 370/400; 709/220; 709/223; 715/734; 715/744
(58) Field of Classification Search .................. None
See application file for complete search history.

(56) References Cited

U.S. PATENT DOCUMENTS

| | | | |
|---|---|---|---|
| 2004/0078105 A1* | 4/2004 | Moon et al. ................. | 700/100 |
| 2006/0031930 A1* | 2/2006 | Patrick et al. ................ | 726/14 |
| 2006/0250981 A1 | 11/2006 | Li et al. | |
| 2006/0265583 A1 | 11/2006 | Eilam et al. | |
| 2007/0028175 A1* | 2/2007 | Moore et al. ................. | 715/733 |
| 2007/0244904 A1* | 10/2007 | Durski ......................... | 707/10 |
| 2008/0005155 A1* | 1/2008 | Soma et al. .................. | 707/102 |
| 2008/0069124 A1* | 3/2008 | Patrick ......................... | 370/401 |
| 2008/0239985 A1* | 10/2008 | Karve et al. ................. | 370/254 |
| 2008/0250386 A1* | 10/2008 | Erl ............................... | 717/100 |

OTHER PUBLICATIONS

Mika, Marek, et al., "A Metaheuristic Approach To Scheduling Workflow Jobs On A Grid", http://www-unix.mcs.anl.gov/~schopf/BookFinal.pdf, (2004), Chapter 19, pp. 295-318.
Yao, Dean, et al., "A Framework for Platform-Based Dynamic Resource Provisioning", http://cache-www.intel.com/cd/00/00/19/55/195590_195590.pdf, (Oct. 30, 2004).

* cited by examiner

*Primary Examiner*—Daniel J. Ryman
*Assistant Examiner*—Brian Roberts
(74) *Attorney, Agent, or Firm*—Brake Hughes Bellermann LLP

(57) ABSTRACT

User interfaces are described for modeling estimations of resource provisioning. An example user interface may request a display of graphical indicators associated with nodes and edges, request a determination of an indicator of a service node workload associated with a service node included in a workflow path based on attribute values associated with the service node and an indicator of a propagated workload, and request provisioning of service nodes onto hardware nodes. The nodes may include external invocation nodes, service nodes, and hardware nodes, and the edges may include node connectors. An indication of an arrangement of an external invocation node, a group of service nodes, a group of node connectors, and a group of hardware nodes may be received, wherein the arrangement may be configured by a user interacting with the displayed graphical indicators, and may represent a workflow path.

21 Claims, 14 Drawing Sheets

400 r

500

600

USER INTERFACE FOR MODELING ESTIMATIONS OF RESOURCE PROVISIONING

TECHNICAL FIELD

This description relates to techniques for modeling estimations of resource provisioning via user interfaces.

BACKGROUND

Enterprise business software companies are increasingly altering the architecture of their software products in order to provide greater flexibility for corporations or other users of their systems. Conventional business software may include a layered architecture design, for example, a three-layer architecture which may include a database layer, application server layer and user interface layer. However, more recent business software may be designed based on a Service Oriented Architecture (SOA).

There are a number of differences between a layered architecture and a SOA. For example, a layered architecture may be constructed using server silos wherein a single software layer such as a database may be maintained on a single hardware resource or a cluster of resources. Tight coupling of entire software layers to hardware resources may thus be a characteristic of example layered architectures.

In contrast, an SOA may provide system functionality distributed over many software services that each provide their own programming interface for inter-communication with other services. Since software services encapsulate functionality at a much greater level of granularity they may provide looser-coupling and higher flexibility than a layered architecture. Such a system may be generated based on an orchestration of all services combined into workflows. Services in themselves may be layered but this may be considered unimportant to the overall system as only the service interface may be exposed to the system.

Characteristics that may determine hardware resource provisioning on a system based on SOA may be much more complex than that of a typical layered architecture because of the higher numbers and granularity of services in the SOA approach. However, resource provisioning for a SOA may be equally as important as resource provisioning for a layered architecture. Thus, it may be desirable to provide techniques which may improve estimates for resource provisioning of architectures such as service oriented architectures.

SUMMARY

According to one general aspect, a system includes a user interface configured to request a display of graphical indicators associated with a plurality of nodes and edges, wherein the nodes include external invocation nodes, service nodes, and hardware nodes, and the edges include node connectors. The user interface may be further configured to receive an indication of a first arrangement of a first external invocation node, a first group of service nodes, a first group of node connectors, and a first group of hardware nodes, wherein the first arrangement is configured by a user interacting with the displayed graphical indicators. The user interface may be further configured to determine whether the indication of the first arrangement includes a representation of a first workflow path including the first external invocation node, the first group of service nodes, the first group of node connectors, and the first group of hardware nodes, wherein the first workflow path includes a first directed ordered path indicating a first ordering of a flow of execution of services associated with the first group of service nodes, from the first external invocation node, to one or more of the hardware nodes included in the first group of hardware nodes. The user interface may be further configured to request a determination of an indicator of a first service node workload associated with a first service node included in the first workflow path based on attribute values associated with the first service node and an indicator of a first propagated workload based on combining attribute values associated with the first external invocation node and one or more other service nodes or node connectors preceding the first service node in the first workflow path based on the ordering, and request provisioning of the first service node onto a first hardware node included in the first group of hardware nodes based on combining the indicator of the first service node workload associated with the first service node and an indicator of a first current resource demand associated with the first hardware node.

According to another aspect, a method includes requesting a display of graphical indicators associated with a plurality of nodes and edges, wherein the nodes include external invocation nodes, service nodes, and hardware nodes, and the edges include node connectors. The method further includes receiving an indication of a first arrangement of a first external invocation node, a first group of service nodes, a first group of node connectors, and a first group of hardware nodes, wherein the first arrangement is configured by a user interacting with the displayed graphical indicators. The method further includes determining whether the indication of the first arrangement includes a representation of a first workflow path including the first external invocation node, the first group of service nodes, the first group of node connectors, and the first group of hardware nodes, wherein the first workflow path includes a first directed ordered path indicating a first ordering of a flow of execution of services associated with the first group of service nodes, from the first external invocation node, to one or more of the hardware nodes included in the first group of hardware nodes. The method further includes requesting a determination of an indicator of a first service node workload associated with a first service node included in the first workflow path based on attribute values associated with the first service node and an indicator of a first propagated workload based on combining attribute values associated with the first external invocation node and one or more other service nodes or node connectors preceding the first service node in the first workflow path based on the ordering; and requesting provisioning of the first service node onto a first hardware node included in the first group of hardware nodes based on combining the indicator of the first service node workload associated with the first service node and an indicator of a first current resource demand associated with the first hardware node.

According to yet another aspect, a computer program product is tangibly embodied on a computer-readable medium and is configured to cause a data processing apparatus to request a display of graphical indicators associated with a plurality of nodes and edges, wherein the nodes include external invocation nodes, service nodes, and hardware nodes, and the edges include node connectors, receive an indication of a first arrangement of a first external invocation node, a first group of service nodes, a first group of node connectors, and a first group of hardware nodes, wherein the first arrangement is configured by a user interacting with the displayed graphical indicators. The computer program product may be further configured to cause the data processing apparatus to determine whether the indication of the first arrangement includes a representation of a first workflow path including the first external invocation node, the first group of service nodes, the first group of node connectors, and the first group of hardware nodes, wherein the first workflow path includes a first directed ordered path indicating a first ordering of a flow of execution of services associated with the first group of service nodes, from the first external invocation node, to one or more of the hardware nodes included in the first group of hardware nodes. The computer program product may be further configured to cause the data processing apparatus to request a determination of an indicator of a first service node workload associated with a first service node included in the first workflow path based on attribute values associated with the first service node and an indicator of a first propagated workload based on combining attribute values associated with the first external invocation node and one or more other service nodes or node connectors preceding the first service node in the first workflow path based on the ordering, and request provisioning the first service node onto a first hardware node included in the first group of hardware nodes based on combining the indicator of the first service node workload associated with the first service node and an indicator of a first current resource demand associated with the first hardware node.

The details of one or more implementations are set forth in the accompanying drawings and the description below. Other features will be apparent from the description and drawings, and from the claims.

DETAILED DESCRIPTION

Figure 1:
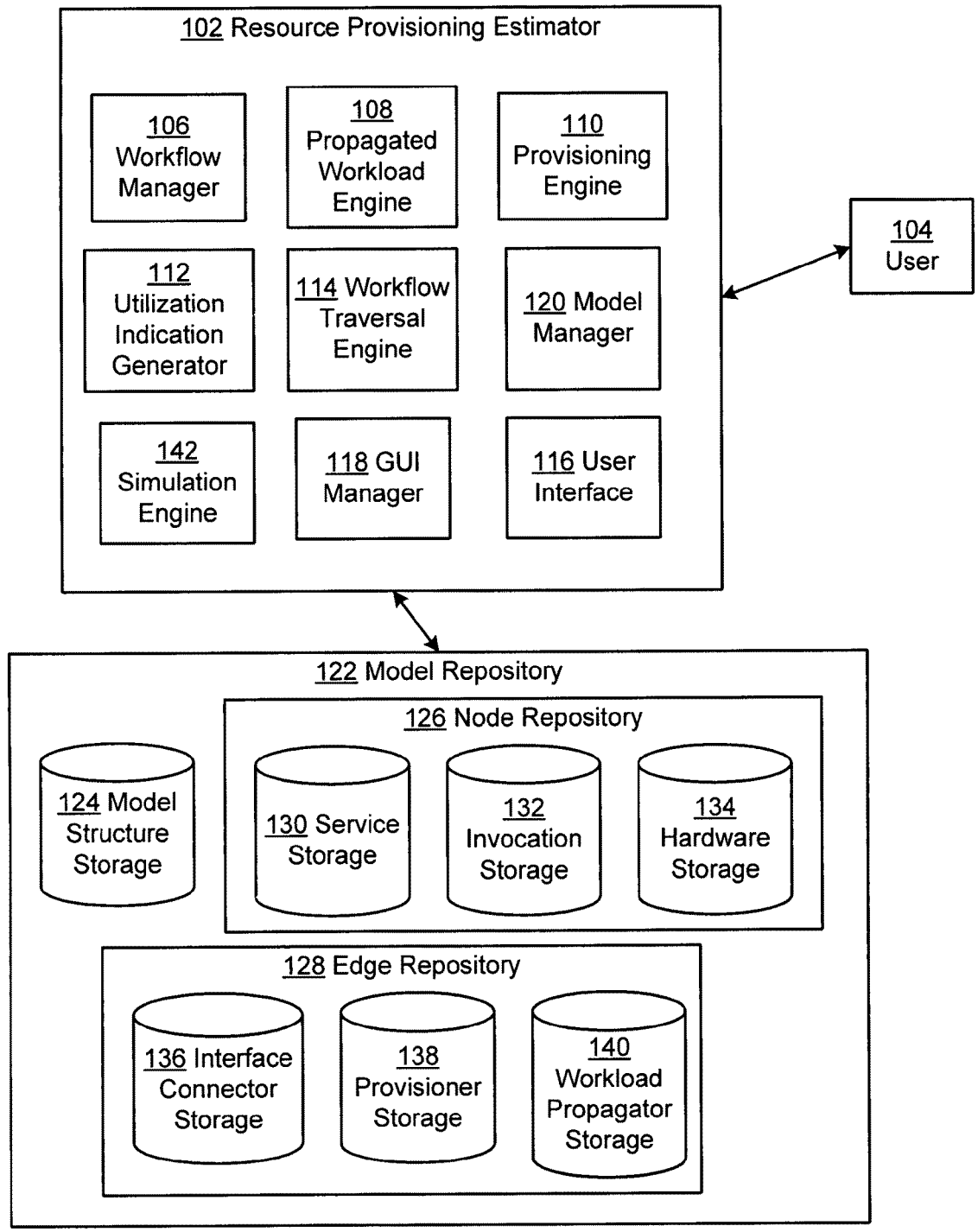
FIG. 1 is a block diagram of an example system for estimating resource provisioning according to an example embodiment.

FIG. 1 is a block diagram of a system 100 for estimating resource provisioning according to an example embodiment. In the example of FIG. 1, a resource provisioning estimator 102 may include various processing engines that provide and perform processing of models or designs that may be displayed, for example, for a user 104. The resource provisioning estimator 102 may include a workflow manager 106 configured to obtain a first workflow path including a first external invocation node, a first group of service nodes, a first group of node connectors, and a first group of hardware nodes, wherein the first workflow path includes a first directed ordered path indicating a first ordering of a flow of execution of services associated with the first group of service nodes, from the first external invocation node, to one or more of the hardware nodes included in the first group of hardware nodes.

For example, a workflow may indicate a flow of execution of services that may result from an invocation of a service such as a "create purchase order" service via an external invocation such as a user calling the service "create purchase order." For example, the workflow path may extend from the invocation to a terminating hardware node, upon which services may be provisioned, or deployed for execution, and an analysis may be performed, for example, after all services in workload paths have been provisioned.

According to an example embodiment, a propagated workload engine 108 may be configured to determine an indicator of a first service node workload associated with a first service node included in the first workflow path based on attribute values associated with the first service node and an indicator of a first propagated workload based on combining attribute values associated with the first external invocation node and one or more other service nodes or node connectors preceding the first service node in the first workflow path based on the ordering.

An example provisioning engine 110 may be configured to provision the first service node onto a first hardware node included in the first group of hardware nodes based on combining the indicator of the first service node workload associated with the first service node and an indicator of a first current resource demand associated with the first hardware node. According to an example embodiment, the provisioning engine may be configured to determine a provisioning of services and resources associated with each hardware node included in a model based on traversing all workflow paths included in the model that include each hardware node.

According to an example embodiment, a utilization indication generator 112 may be configured to determine a utilization indicator associated with the first hardware node based on the indicator of the first current resource demand and a first total resources indicator associated with the first hardware node.

According to an example embodiment, a workflow traversal engine 114 may be configured to traverse the first workflow path from the first external invocation node to the first hardware node.

According to an example embodiment, a user interface 114 may be configured to provide an interface between the user 104 and other engines or storage areas associated with the system 100. The user interface 114 may further receive information from, and provide information to the user 104, for example, via a graphical user interface (GUI) manager 118. For example, the user 104 may generate a model or design of a SOA system and via the GUI manager 118 and the user interface 114. For example, the user interface 114 may be configured to enforce structural design constraints associated with entities that may be included in the model or design. For example, if an "external invocation" node may only be connected to a "service" node via an "interface connector" edge, the user interface 114 may be configured to ensure that the user 104 does not erroneously connect the "external invocation" node to a "service" node via an edge having a type other than the "interface connector" edge type. The GUI manager 118 may be configured, for example, to generate a display of a design of a system including one or more workflows. The GUI manager 118 may be configured, for example, to generate a display of results of simulation of a design of a system including one or more workflows.

According to an example embodiment, an example model manager 120 may be configured to obtain a model representing an arrangement of one or more invocation nodes and a plurality of service nodes, node connectors, and hardware nodes, wherein the model includes the first workflow path. For example, the model manager 120 may be configured to obtain a model from the user 104 via the GUI manager 118 and the user interface 116.

According to an example embodiment, a model repository 122 may be configured to store information associated with workflows and models based on the workflows. For example, information regarding the structure of a workflow model may be stored in the model repository 122. According to an example embodiment, the model repository 122 may include a model structure storage area 124 that may be configured to store model structure information. For example, the model structure storage area 124 may be configured to store model structure information such as a directed acyclic graph corresponding to the structure associated with a graphical representation of a modeled system such as a SOA system.

According to an example embodiment, the model repository 122 may include a node repository 126 that may be configured to store node information associated with one or more nodes included in one or more model structures associated with the model structure information, and an edge repository 128 that may be configured to store edge information associated with one or more edges included in one or more model structures associated with the model structure information.

According to an example embodiment, the model structure information may be associated with at least one model that represents an arrangement of a plurality of nodes including one or more service nodes, external invocation nodes, or hardware nodes, and one or more edges including the node connectors, including one or more interface connectors, provisioners, or workload propagators.

According to an example embodiment, the node repository 126 may include a service storage area 130 that may be configured to store information associated with service nodes, an invocation storage area 132 that may be configured to store information associated with invocation nodes including external invocation nodes, and a hardware storage area 134 that may be configured to store information associated with hardware nodes. For example the service nodes may represent services such as "create purchase order" services. For example, the external invocation nodes may represent users that may invoke services. For example, the hardware nodes may represent hardware such as servers in a system such as a SOA system.

According to an example embodiment, the edge repository 128 may include an interface connector storage area 136 that may be configured to store information associated with interface connector edges, a provisioner storage area 138 that may be configured to store information associated with provisioner edges, and a workload propagator storage area 140 that may be configured to store information associated with invocation edges. For example, the interface connector edges may represent interface connectors that may connect external invocation nodes to service nodes, the provisioner edges may represent provisioners that may connect services to hardware nodes to effect provisioning, or deployment, of the services to the connected hardware nodes, and the workload propagator edges may connect services to other services to propagate a workload value through a workflow path to a server node for provisioning.

According to an example embodiment, the resource provisioning estimator may include a simulation engine 142 that may be configured to initiate execution of a simulation of a model or design after completion by a user of graphical user interface screens via the user interface 116 and the GUI manager 118. For example, the user 104 may generate a model or design of a SOA system and via the GUI manager 118 and the user interface 114, and may simulate the operation of the designed system via the simulation engine 142.

Example methods and systems are discussed herein for estimating resource provisioning via modeling and simulation techniques. Example methods and systems described herein may, for example, provide modeling and simulation techniques for a user to design a SOA system and determine and analyze an estimate of provisioning prior to actual deployment of services to actual hardware.

Service oriented architectures (SOAs) may provide an ability to reuse functionality included in a service by incorporating a single service in a number of different system configurations. Thus, a service landscape may be considered in hardware provisioning, including, for example, consideration of construction of workflows.

A conventional technique for estimating hardware resource provisioning for a layered architecture, which may be referred to as sizing in the domain of enterprise software, may rely on an ability to quantify the processing power of any hardware to an abstract benchmark unit which may be meaningful to the domain in which the system may run. Conventional approaches have used a theoretical reference machine. For example, a hardware independent unit for measuring the processing power of a system based on throughput and response time may be referred to as "SAPS." Such a unit may provide a means of comparison between two systems regardless of the number of tiers in a layered architecture (e.g., 2-tier, 3-tier, multi-tier), and regardless of client/server configurations. As an example, 100 units of SAPS may be determined to be equivalent to 2000 fully processed order lines per hour, which may entail processing 6000 dialog steps (e.g., screen changes) with 2000 postings or 2400 system transactions. Analogously, other benchmark units may include a FLOPS benchmark unit which may be associated with hardware performance, referring to "floating-point operations per second," and a TPS benchmark unit which may be associated with database applications, referring to "transactions per second."

According to an example embodiment, a first step in a sizing procedure may include performing a benchmark on system hardware to determine a capability of the system, for example, in terms of processing power. For example, for business software systems, a benchmark process may include a Sales and Distribution (SD) benchmark. One skilled in the art of data processing will appreciate that there may be many other benchmarks which may be used to provide a more useful unit for comparison between different systems. According to an example embodiment, the SD benchmark may create intensive load on a system for determining the maximum processing power of the system measured in units of SAPS. A final step in the sizing procedure may include determining a number of units of SAPS needed to match the anticipated demand created by the system.

Resource provisioning for SOA may be equally as important as resource provisioning for a layered architecture. Despite the scalability of the sizing procedure for layered architectures, conventional resource provisioning techniques for layered architectures may not provide optimal results for SOAs, as increased knowledge of a finer granularity regarding the services that make up the system, how services are connected together, and increased knowledge of the workflow of services may be important considerations for hardware provisioning in SOA. Service reuse characteristics of an SOA may place a high demand on a single service in a system, thereby creating a bottleneck which may affect all workflows that include the service experiencing the high demand.

Example sizing techniques discussed herein may be utilized, for example, in a model that provides a relationship between a design of a SOA and the estimated hardware resource provisioning associated with the design. Example techniques discussed herein may utilize a number of entities which may include nodes and edges that may form a graph.

According to an example embodiment, a service may be represented by a node that may describe a loosely-coupled, autonomous business or technical functionality which communicates with other services via an interface. For example, a "create purchase order" service may describe a business functionality for creating a purchase order, and may communicate with another service such as a "send email" service, via an interface.

According to an example embodiment, an external invocation may be represented by a node that may describe a load produced in a system as a result of one or more users or external invocations. For example, a system user that commences a monthly payroll process or a customer order that creates an external workload on the system may be represented by an external invocation.

According to an example embodiment, an interface connector may be represented by an edge that may be used to indicate a relationship between an external invocation and a first invoked service in a workflow. For example, an interface connector may indicate that a user invokes a service such as "create purchase order," and that "create purchase order" is the first invoked service in a workflow. In this context, a workflow path may be represented by a directed ordered path including an external invocation node, a group of service nodes, a group of node connectors, and a group of one or more hardware nodes. The workflow path may include a directed ordered path indicating an ordering of a flow of execution of services associated with the group of service nodes, from the external invocation node, to one or more of the hardware nodes included in the first group of hardware nodes. For example, nodes may be connected via edges that may be associated with a direction as an attribute. For example, an edge may be associated with a direction by virtue of a structural requirement that the edge may only be employed to connect particular node types, or the edge may be associated with attributes such as a "source node" and a "target node." For example, with regard to a directed path associated with a workflow path, "forward" edges may be traversed to provide a traversal that visits entities in a particular order, for example, "moving forward" through entities included in a path.

According to an example embodiment, a workload propagator may be represented by an edge. Because of the loosely-coupled nature of SOAs a service may be configured to invoke any other service, and the invoked service may in turn invoke further services. As a result, for example, a service orchestration may be created in which the order and the services involved in each workflow may be significant factors for hardware resource provision estimations, and may be described as an array of relationships between services in the system. According to an example embodiment, a workload propagator may represent the relationship of one service invoking another service in example models discussed herein.

According to an example embodiment, a hardware entity may be represented by a node in a SOA that provides the computational power or processing power to fulfill the demand of deployed services. According to an example embodiment, all hardware in an example system may be represented as a set of servers. However, one skilled in the art of data processing may appreciate that such processing power may be provided by entities other than servers.

According to an example embodiment, a provisioner may be represented by an edge that indicates a relationship between a service and hardware. For example, the relationship may indicate a provisioning, or deployment, of a service onto a hardware node. The hardware node may supply all computational or processing power to meet the demand created by the services deployed on the hardware.

Figure 2:
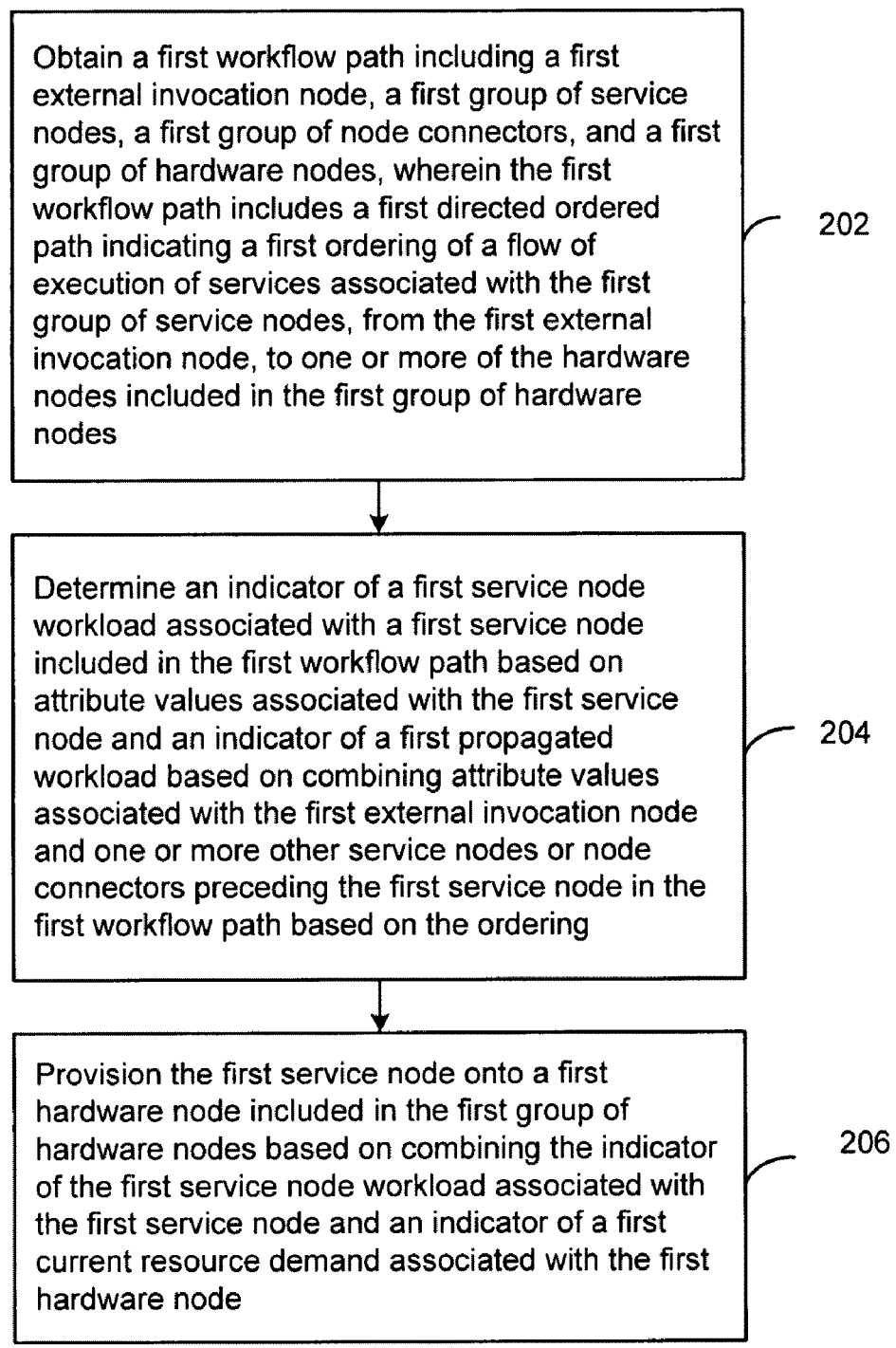
FIG. 2 is a flowchart illustrating an operation of the example system of FIG. 1.

FIG. 2 is a flowchart illustrating an example operation of the system of FIG. 1. According to an example embodiment, a first workflow path including a first external invocation node, a first group of service nodes, a first group of node connectors, and a first group of hardware nodes, may be obtained, wherein the first workflow path includes a first directed ordered path indicating a first ordering of a flow of execution of services associated with the first group of service nodes, from the first external invocation node, to one or more of the hardware nodes included in the first group of hardware nodes (202). For example, the workflow manager 106 may obtain the first workflow path, for example, from the model repository 122. For example, the workflow manager 106 may obtain the first workflow path based on information stored in the model structure storage area 124. For example, the workflow manager 106 may obtain the first workflow path based on input from the user 104 via the user interface 116.

According to an example embodiment, the service nodes and hardware nodes may be associated with attribute values. For example, each of the service nodes may be associated with attribute values including a total workload value associated with external invocations of the service, a temporary workload value, and a units of work value associated with an amount of work expended to execute each invocation of the service, and a resource demand value associated with service based on combining the units of work and the workload values which may be stored, for example, in the service storage area 130. For example, each of the hardware nodes may be associated with a total demand value indicating a total demand of computing power associated with the hardware node, a total supply value indicating a total supply of computing power associated with the hardware node, and a utilization value indicating a utilization of the computing power associated with the hardware node, based on combining the total demand and the total supply values which may be stored, for example, in the hardware storage area 134.

An invocation node such as an external invocation node may be associated with an invocation rate which may be stored, for example, in the invocation storage area 132.

An indicator of a first service node workload associated with a first service node included in the first workflow path may be determined based on attribute values associated with the first service node and an indicator of a first propagated workload based on combining attribute values associated with the first external invocation node and one or more other service nodes or node connectors preceding the first service node in the first workflow path based on the ordering (204). For example, the indicator of the first service node workload associated with the first service node included in the first workflow path may be determined by the example propagated workload engine 108 as discussed previously.

The first service node may be provisioned onto a first hardware node included in the first group of hardware nodes based on combining the indicator of the first service node workload associated with the first service node and an indicator of a first current resource demand associated with the first hardware node (206). For example, the first service node may be provisioned onto the first hardware node by the example provisioning engine 110 discussed previously. According to an example embodiment, the first service node may be provisioned onto the first hardware node based on traversing the first workflow path from the first external invocation node to the first hardware node.

According to an example embodiment, a model representing an arrangement of one or more invocation nodes and a plurality of service nodes, node connectors, and hardware nodes, may be obtained, wherein the model includes the first workflow path. According to an example embodiment, the model may be obtained be the model manager 120 from the model repository 122 discussed previously. According to an example embodiment, the model may represent an arrangement of a plurality of nodes including one or more service nodes, external invocation nodes, or hardware nodes, and one or more edges including the node connectors, including one or more interface connectors, provisioners, or workload propagators.

According to an example embodiment, obtaining the model may include obtaining a directed acyclic graph that includes the first external invocation node, the first group of service nodes, the first group of node connectors, and the first group of hardware nodes. According to an example embodiment, the directed acyclic graph may be obtained from the model structure storage area 124 discussed previously.

According to an example embodiment, for each one of the hardware nodes included in the model, a provisioning of services and resources associated with the each hardware node may be determined based on traversing all workflow paths included in the model that include the each hardware node.

According to an example embodiment, a utilization indicator associated with the first hardware node may be determined based on the indicator of the first current resource demand and a first total resources indicator associated with the first hardware node. For example, the utilization indicator may indicate a percentage of available resources associated with the first hardware node may be utilized by a provisioning resulting from a simulation of a designed model such as a SOA system. According to an example embodiment, a display of a representation of the utilization indicator associated with the first hardware node may be generated, as discussed below with regard to FIGS. 11 and 12.

According to an example embodiment, a second workflow path including a second external invocation node, a second group of service nodes, a second group of node connectors, and a second group of hardware nodes may be obtained, wherein the second workflow path includes a second ordered path indicating a second ordering of a flow of execution of services associated with the second group of service nodes, from the second external invocation node, to one or more of the hardware nodes included in the second group of hardware nodes. An indicator of a second service node workload associated with a second service node included in the second workflow path may be determined based on attribute values associated with the second service node and an indicator of a second propagated workload based on combining attribute values associated with the second external invocation node and one or more other service nodes or node connectors preceding the second service node in the second workflow path based on the ordering. The second service node may be provisioned onto a second hardware node included in the second group of hardware nodes based on combining the indicator of the second service node workload associated with the second service node and an indicator of a second current resource demand associated with the second hardware node.

Example attribute values may be associated at least with each node in a model, for example, to provide quantified predictions of demands on hardware by a particular configuration. For example, an invocation rate r may be associated with an external invocation node, and may be defined as a number of invocations over a period of time as follows:

$$\text{invocation rate} \rightarrow r \text{ unit: } [1/s]$$

An invocation may be at least in average considered to be constant. According to an example embodiment, the invocation rate may be provided by a user of the model, for example, via the user interface 116.

Example services may be associated with example attributes such as workload, units of work, and resource demand, as follows:

$$\text{workload} \rightarrow w \text{ unit. } [1/s]$$

$$\text{units of work} \rightarrow u \text{ unit: } [SAPS*s]$$

$$\text{resource demand} \rightarrow d = u*w \text{ unit: } [SAPS]$$

The example attribute workload w may be based on external invocations of a particular service. The example attribute u (i.e., units of work) may be a fixed parameter that may be specified for each service, and may describe an average amount of work a service needs to execute for each invocation. An example physical unit of the example attribute u may be expressed as benchmark unit * s. For example, if the benchmark unit is specified in SAPs (e.g., for SAP applications), then the example attribute u may be expressed as SAPS* s. By multiplying a units of work attribute value with a Workload attribute value, a demand d of a service may be calculated in terms of Benchmark Units (e.g., in terms of SAPS for SAP applications).

Example hardware may be associated with example attributes such as supply of computational power and utilization, as follows:

$$\text{supply of computational power} \rightarrow h \text{ unit: } [SAPS]$$

$$\text{utilization} \rightarrow d/h \text{ wherein d is the total demand}$$

A supply of computational resources (e.g., hardware) may be expressed in terms of benchmark units (e.g., SAPS for SAP applications). The utilization may be expressed as a ratio of the total demand d, which, for example, may be determined as a sum of demands incurred from each deployed service.

Example attribute values may also be associated at least with edges in a model. For example, a workload propagator may be associated with an attribute such as a multiplier between two services as follows:

multiplier→$m_{ij}$ between service j ($w_j$) and service i ($w_i$)

The multiplier $m_{ij}$ may indicate a workload propagation that a service j imposes on another service i resulting from sending messages (e.g., invocations) from j to i.

According to an example embodiment, a system design model may be based on a weighted directed acyclic graph wherein weights may be provided by one or more workload propagators. According to an example embodiment, cycles may be excluded, as cycles in a workflow of services may be unlikely to occur in SOA systems. Workflows in SOA may have clearly defined sources of invocation and corresponding sinks.

According to an example embodiment, service workloads, invocation rates, and workload propagators may be related via a linear equation as follows:

$$\sum_{j=1}^{n} m_{ij} \cdot w_j = r_i \quad (1)$$

wherein $n$ represents the number of services

An example matrix associated with the multipliers and corresponding to the linear equation (1) shown above may have the following three properties:
1) $m_{ij}=1$
2) $m_{ij} \leq 0$ when i≠j
3) $m_{ij} m_{jk} \ldots m_{li}=0$ for all possible cyclic permutations The first of the three properties shown above may result from no self-inflicted load on the SOA. The second of the three properties may be related to a condition that a workload is always positive (e.g., $-m_{ij}$ may represent an actual change in workload). The third of the three properties may reflect a condition that the corresponding directed graph is acyclic.

An example equation that includes three example services may thus be described as follows:

$$\begin{pmatrix} 1 & m_{12} & m_{13} \\ 0 & 1 & m_{23} \\ 0 & 0 & 1 \end{pmatrix} \cdot \begin{pmatrix} w_1 \\ w_2 \\ w_3 \end{pmatrix} = \begin{pmatrix} r_1 \\ r_2 \\ r_3 \end{pmatrix} \quad (2)$$

The example matrix of multipliers shown above is triangular because the graph is acyclic, i.e., $m_{12} m_{21}=0$, $m_{13} m_{31}=0$, $m_{23} m_{32}=0$ and $m_{12} m_{23} m_{31}=0$. However, this may not be true generally, as for n>3, example scenarios may be determined wherein both the upper and the lower triangle may be populated with one or more nonzero values.

According to an example embodiment, the demand due to a single service j may be defined by $d_j=w_j \cdot u_j$. The total demand d placed on a hardware node may be determined as the sum of the demands of all services deployed on the hardware node, as follows:

$$d = \sum_{j=1}^{k} d_j, \quad (3)$$

wherein $k$ is the number of deployed services on the hardware

According to an example embodiment, a utilization may be defined as a ratio d/h wherein h denotes the computational resource supply, as discussed previously.

According to an example embodiment, an example modeling technique may provide a graphical representation of the example model entities as discussed previously and may provide a means of specifying the parameters or attributes associated with the model. Once an SOA design or landscape is generated the technique may solve underlying equations as discussed previously, and may provide a display of the model's estimated hardware provisioning in the system for viewing by a user, for example, a system designer. For example, the example techniques may provide a display indicating the utilization of each hardware node. For example, the display may indicate a percentage of utilization of available computation power, and may additionally indicate a variance of input rate, based on an assumption that external invocations may not occur at a constant rate.

Figure 3:
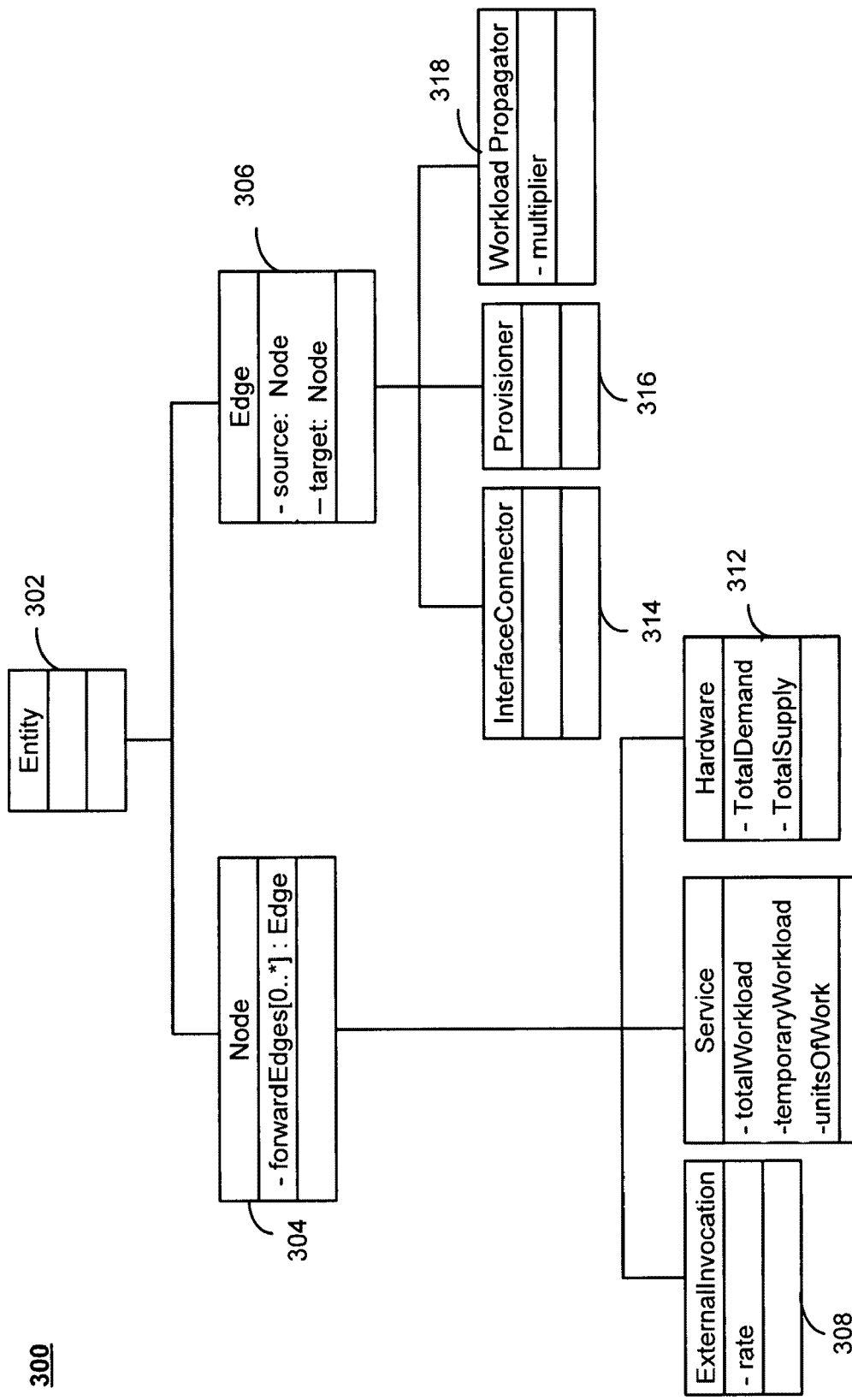
FIG. 3 depicts example entities associated with example model structures according to an example embodiment.

FIG. 3 depicts example entities associated with example model structures according to an example embodiment. More particularly, FIG. 3 depicts a Unified Modeling Language (UML) diagram 300 illustrating example entities associated with an example model structure according to an example embodiment. As shown in FIG. 3, an entity 302 may include a node entity 304 and an edge entity 306. According to an example embodiment, the node entity 304 may be associated with an attribute value of a vector of one or more forward edges indicating one or more forward edges emanating from the node in an associated model structure. According to an example embodiment, the edge entity 306 may be associated with attribute values including a source node value and a target node value indicating a source node and a target node connected via the edge in the associated model structure.

According to an example embodiment, the node entity 304 may include an external invocation entity 308, a service entity 310, and a hardware entity 312. According to an example embodiment, the external invocation entity 308 may be associated with an attribute value indicating a rate of invocation, for example, 3 invocations per second. According to an example embodiment, the service entity 310 may be associated with attribute values indicating a total workload, a temporary workload, and a units of work value, as discussed previously. According to an example embodiment, the hardware entity 312 may be associated with attribute values indicating a total demand value and a total supply value, for example, associated with computation power, as discussed previously.

According to an example embodiment, the edge entity 306 may include an interface connector entity 314, a provisioner entity 316, and a workload propagator entity 318. According to an example embodiment, the provisioner entity 316 may indicate a forward edge or connection between a service node 310 and a hardware node 312, and may indicate the deployment of the service represented by the service node 310 onto the hardware represented by the hardware node 312 on which the service is to be executed.

According to an example embodiment, the workload propagator entity 318 may be associated with an attribute value indicating a multiplier, which may indicate a workload propagation that may occur as a result of a first service sending messages to, or invoking, a second service. For example, the multiplier may indicate a workload propagation imposed on a target node as a result of a source node sending messages to, or invoking the target node.

As discussed previously, a graphical representation of the model entities described above may be displayed, and parameters and/or quantifiers of the model may be specified, for example, by a user or other external source. Once a SOA design is generated, one or more underlying equations may be solved, utilization results may be generated for each hardware node 312, and an estimated hardware provisioning in the system may be provided to a user, for example, a system designer.

According to an example embodiment, an algorithm may be configured to determine the utilization results based on the underlying acyclic directed graph. An example algorithm may be based on consecutive forward edges along the graph which may be referred to as representing paths or workflows each associated with a starting point and an endpoint. By iterating along all possible paths or workflows the example algorithm may provide solutions to the equations discussed above. According to an example embodiment, the entities referenced by Algorithm 1 shown below may correspond to the example UML representation of the entities as discussed previously with regard to FIG. 3.

According to an example embodiment, Algorithm 1 as shown below illustrates pseudocode associated with an example algorithm that may provide solutions to the equations discussed previously by traversing paths of the directed acyclic graph as discussed previously. As shown in Algorithm 1, an example recursive technique may travel from a source node to a target node following forward edges 306 that may represent connections between the nodes 304 of the directed acyclic graph. As shown in Algorithm 1, the example recursive technique may be initiated by an external invocation 308 and may terminate on a hardware node 312.

---

Algorithm 1
Algorithm for model processing

---

```
FOR EACH edge IN ExternalInvocations.forwardEdges
    evaluateNode( edge )
FUNCTION evaluateNode( Edge edge )
    source = edge.source
    target = edge.target
    CASE edge OF TYPE
        InterfaceConnector:
            target.temporaryWorkload = source.rate
            target.totalWorkload += target.temporaryWorkload
            BREAK
        WorkloadPropagator:
            target.temporaryWorkload = source.temporaryWorkload *
                edge.multiplier
            target.totalWorkload += target.temporaryWorkload
            BREAK
        Provisioner:
            target.totalDemand +=
                source.temporaryWorkload * source.unitsOfWork
            BREAK
        DEFAULT:
            RETURN
    END CASE
    FOR EACH forwardEdge IN target.forwardEdges
        evaluateNode ( forwardEdge )
END FUNCTION
```

An example function evaluateNode(Edge edge), which is called recursively for the pseudocode example shown in Algorithm 1, may be configured to perform processing on nodes as they are traversed by execution of Algorithm 1.

An example argument passed at the start of the algorithm may represent an edge 306 associated with a type of an interface connector 314. As shown in Algorithm 1, the instructions may be processed according to a case statement for an interface connector 314. When execution of the case statement instructions is completed in a first pass, a loop is entered wherein the edges 306 of the target node are queried, and the evaluateNode(...) function is then called recursively on each edge 306 pointing in a forward direction from a current target node 304. When all forward pointing edges 306 from a current target node 304 have been processed, the recursive calls terminate, as, with regard to a particular external invocation 308 and associated workflow, the algorithm has provisioned a service (e.g., representing a deployment of the service) represented by a service node 310 onto hardware represented by a hardware node 312 at that point.

According to an example embodiment, operations that may be performed by the case statement of Algorithm 1 for each type of edge 306 in the acyclic directed graph may be described as follows:

1. For edges 306 of type interface connector 314 (i.e., associated with an external invocation 308 to a service 310), a service temporary workload parameter may be set to a value equal to an external invocation rate. The service 310 temporary workload parameter may then be added to a cumulative service total workload.
2. For edges 306 of type workload propagator 318 (i.e., service 310 to service 310), a target service 310 temporary workload parameter may be set to a value equal to the source service 310 temporary workload multiplied by a multiplier associated with the workload propagator edge 318. The service 310 temporary workload parameter may then be added to the cumulative service total workload.
3. For edges 306 of type provisioner 316 (i.e., service 310 to hardware 312), a value generated as the service 310 temporary workload parameter multiplied by the service units of work may be added to a cumulative hardware 312 total demand, thus effectively provisioning the service node 310 onto the hardware node 312, or deploying the service represented by the service node 310 onto the hardware represented by the hardware node 312 for execution.
4. For other types of edges (e.g., end of service workflow), a recursive call may terminate.

According to an example embodiment, the example techniques discussed above may be integrated into an example graphical technique for drawing or representing all entities 302 and corresponding service workflows. Example graphical representations for each type of entity 302 may be included in an example graphical system model, as discussed below with regard to FIGS. 4-17.

Figure 4:
FIG. 4 depicts an example graphical representation of an external invocation according to an example embodiment.

FIG. 4 depicts an example graphical representation of an external invocation 400 according to an example embodiment. The graphical representation of the external invocation 400 may correspond to the external invocation node 308 discussed previously with regard to FIG. 3. The example external invocation 400 may be associated with multiple user invocations. The invocations may also be triggered by a machine, for example, as may occur in a business-to-business (B2B) context. The external workload or invocation rate r may be set, for example, by the user 104 via a context menu displayed by the GUI manager 118.

Figure 5:
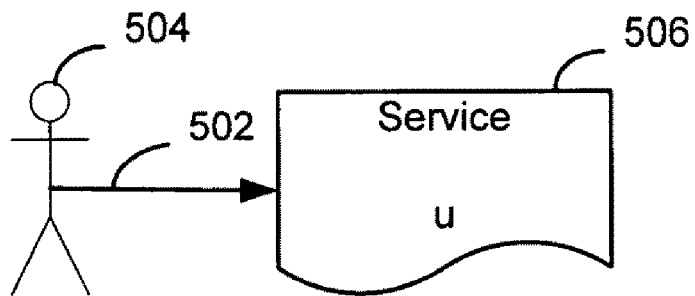
FIG. 5 depicts an example graphical representation of an interface connector according to an example embodiment.

FIG. 5 depicts an example graphical representation of an interface connector according to an example embodiment. As shown in FIG. 5, an example interface connector 502 may map, or connect, any external invocation, for example, an external invocation 504, onto a service such as a service 506. According to an example embodiment, the example interface connector 502 may correspond to the interface connector edge 314, the external invocation 504 may correspond to the external invocation node 308, and the service 506 may correspond to the service node 310 discussed previously with regard to FIG. 3.

Figure 6:
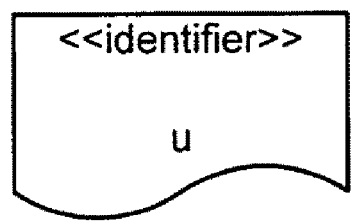
FIG. 6 depicts an example graphical representation of a service 600 according to an example embodiment.

FIG. 6 depicts an example graphical representation of a service 600 according to an example embodiment. As shown in FIG. 6, the example service 600 may include an identifier <identifier> and a value indicating units of work u per invocation that may be set, for example, via a context menu associated with the user interface 104. According to an example embodiment, the example service 600 may correspond to the service node 310 discussed previously with regard to FIG. 3.

Figure 7:
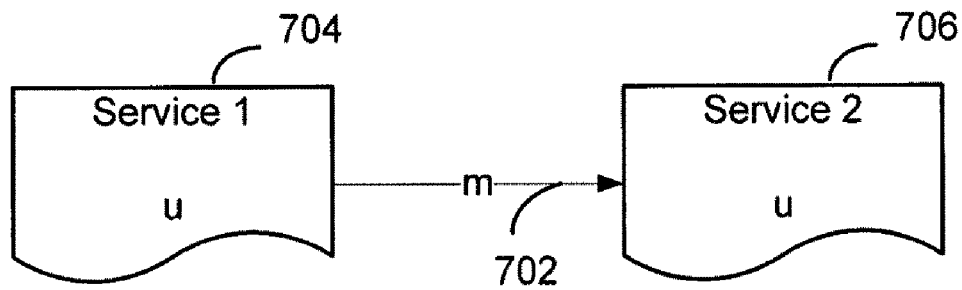
FIG. 7 depicts an example graphical representation of a workload propagator according to an example embodiment.

FIG. 7 depicts an example graphical representation of a workload propagator according to an example embodiment. As shown in FIG. 7, the example workload propagator may be represented by a connector 702 between two services Service 1 704 and Service 2 706. The value of the workload propagator may be indicated by a multiplier m (e.g., m=−$m_{12}$, as discussed previously) as shown associated with the connector or edge 702, and may be set, for example, via a context menu associated with the user interface 104. According to an example embodiment, the example workload propagator represented by the connector 702 may correspond to the workload propagator 318 discussed previously with regard to FIG. 3.

Figure 8:
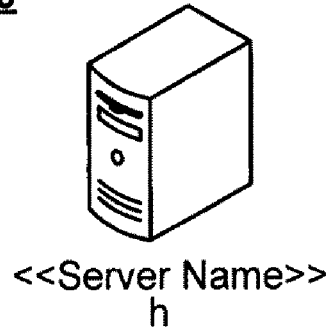
FIG. 8 depicts an example graphical representation of a computation resource supply or hardware node according to an example embodiment.

FIG. 8 depicts an example graphical representation of a computational resource supply h, or hardware node 800 according to an example embodiment. As shown in FIG. 8, the example hardware node 800, or processing power or computational resource supply h may be set via a context menu associated with the user interface 104. According to an example embodiment, the example hardware node 800 may correspond to the hardware node 312 discussed previously with regard to FIG. 3.

Figure 9:
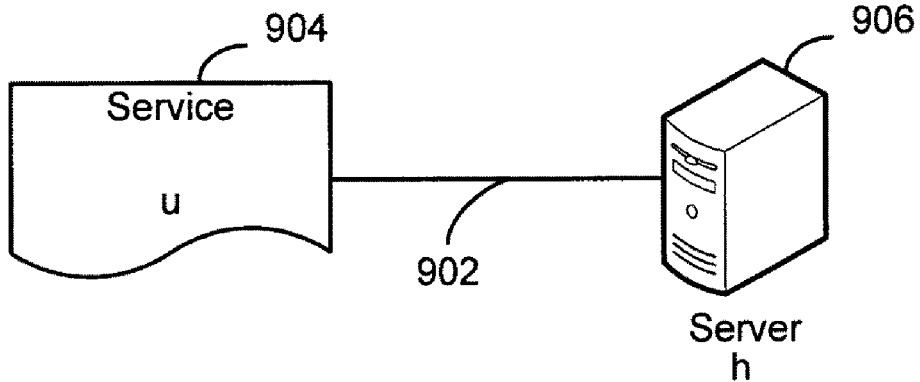
FIG. 9 depicts an example graphical representation of a provisioner according to an example embodiment.

FIG. 9 depicts an example graphical representation of a provisioner according to an example embodiment. As shown in FIG. 9, an example provisioner 902 may indicate the deployment of a service 904 onto hardware 906 on which the service 904 is executed. According to an example embodiment, the example provisioner 902 may correspond to the provisioner 316, the service 904 may correspond to the service 310, and the hardware 906 may correspond to the hardware node 312 discussed previously with regard to FIG. 3.

Figure 10:
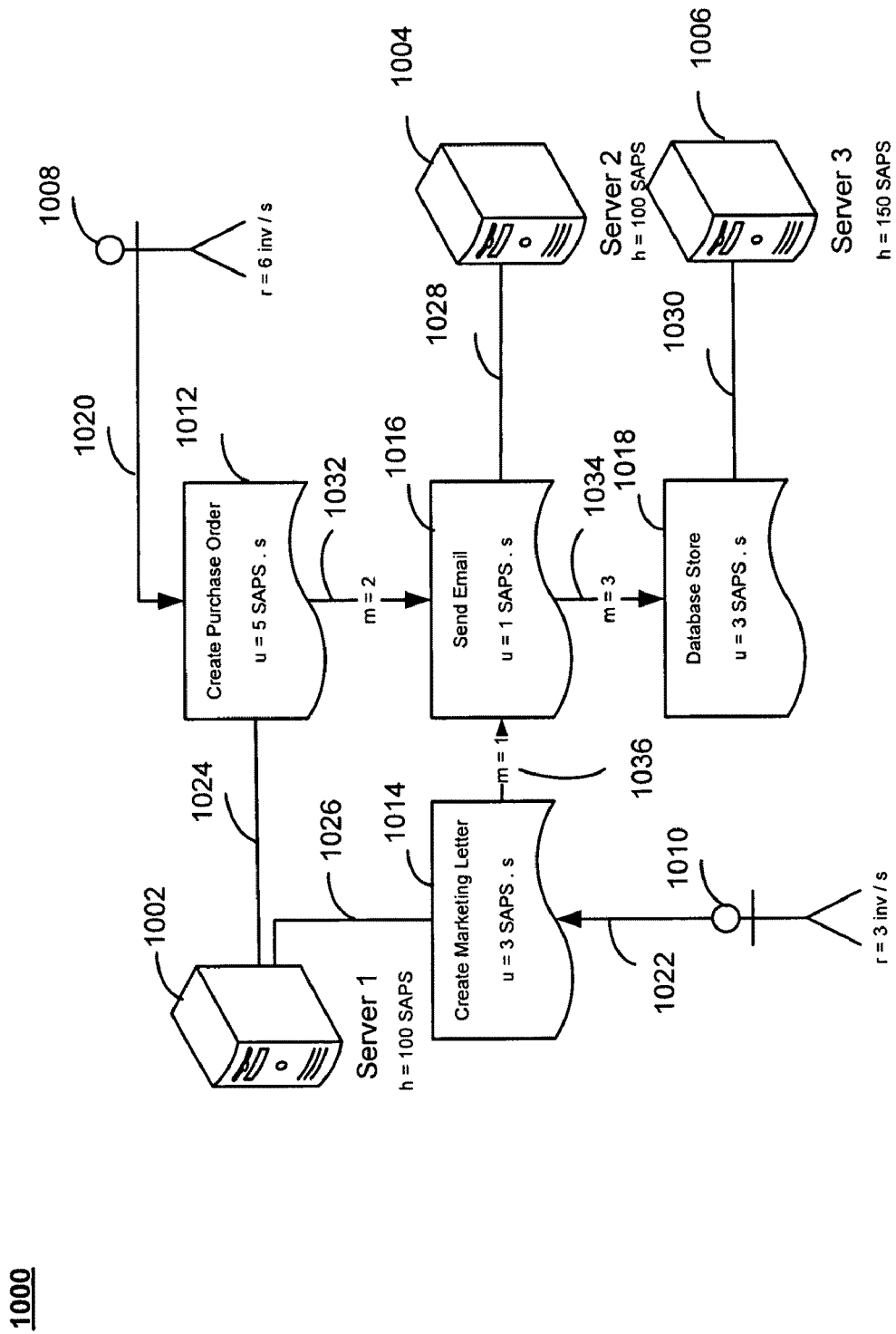
FIG. 10 depicts an example graphical representation of an example model according to an example embodiment.

FIG. 10 depicts an example graphical representation of an example model 1000 depicting a system landscape or design according to an example embodiment. The graphical representation of the example model of FIG. 10 includes an arrangement of graphical representations of entities as discussed previously with regard to FIG. 3 and FIGS. 4-9. The example model 1000 includes nodes such as a server 1 1002, a server 2 1004, and a server 3 1006, each of which may correspond to the hardware node entity 312 discussed previously with regard to FIG. 3. The example model 1000 further includes nodes such as external invocations 1008 and 1010, each of which may correspond to the external invocation node entity 308 discussed previously with regard to FIG. 3. Additionally, the example model 1000 includes nodes such as service nodes create purchase order 1012, create marketing letter 1014, send email 1016, and database store 1018, each of which may correspond to the service node entity 310 discussed previously with regard to FIG. 3.

The example model 1000 further includes interface connector edges 1020, 1022 which may correspond to the interface connector edge 314 discussed previously with regard to FIG. 3. As shown in FIG. 10, the interface connector edge 1020 connects the external invocation 1008 to the service node create purchase order 1012, and the interface connector edge 1022 connects the external invocation 1010 to the service node create marketing letter 1014.

The example model 1000 further includes example provisioner edges 1024, 1026, 1028, 1030 which may correspond to the provisioner edge 316 discussed previously with regard to FIG. 3. As shown in FIG. 10, the provisioner edge 1024 connects the service node create purchase order 1012 to the server 1 node 1002 and the provisioner edge 1026 connects the service node create marketing letter 1014 to the server 1 node 1002. Additionally, the provisioner edge 1028 connects the service node send email 1016 to the server 2 node 1004 and the provisioner edge 1030 connects the service node database store 1018 to the server 3 node 1006.

Additionally, the example model 1000 includes example workload propagator edges 1032, 1034, 1036 which may correspond to the workload propagator edge 318 discussed previously with regard to FIG. 3. As shown in FIG. 10, the workload propagator edges 1032, 1034, 1036 are each associated with multiplier attributes. For example, the workload propagator edge 1032 is associated with a multiplier value of 2, and connects the service node create purchase order 1012 to the service node send email 1016. Thus, for example, each call to the create purchase order service 1012 may cause 2 calls to be sent to the send email service 1016.

As further shown in FIG. 10, the workload propagator edge 1034 is associated with a multiplier value of 3, and connects the service node send email 1016 to the service node database store 1018. Additionally, the workload propagator edge 1036 is associated with a multiplier value of 1, and connects the service node create marketing letter 1014 to the service node send email 1016.

As shown in FIG. 10, the example model scenario 1000 may include two different workflows combined into one service landscape or design in which some of the services are shared by both workflows. For example, the create purchase order service 1012 may share some email and database functionality with the service for creating a marketing letter 1014.

The scenario depicts two external invocations 1008, 1010 each creating some external workload on a SOA based system. As shown in FIG. 10, the example users (e.g., external invocation 1008) which externally invoke the create purchase order service 1012 may invoke at a rate of r=6 invocations per second. For every invocation on the create purchase order service 1012, u=5 units of work (SAPS*s) are performed or exerted by the server (e.g., server 1 1002) on which the create purchase order service 1012 is deployed.

In parallel with, or at the same time as execution of create purchase order 1012 on server 1 1002, there may be some external workload activity from other example users 1010 on the service create marketing letter 1014. As shown in FIG. 10, the invocation rate r of these example users 1010 is r=3 invocations per second. The example create marketing letter service 1014 is associated with a units of work attribute having a value of u=3 SAPS*s, meaning that each invocation on the create marketing letter service 1014 exerts 3 units of work on the server 1 1002. Thus, the example external invocation 1008 causes 6*5=30 benchmark units per second to be exerted on the server 1 node 1002, and the external invocation 1010 causes 3*3=9 benchmark units per second to be exerted on the server 1 node 1002. The processing power or supply h associated with the server 1 1002 has a value of 100 benchmark units, so that the server 1 1002 may have 100−30−9=61 benchmark units per second available for other services after provisioning the create purchase order service 1012 and the create marketing letter 1014 on the server 1 1002. Further, the utilization of the server 1 1002 may be determined as the demand (i.e., 30+9) divided by the available benchmark units (i.e., h=100), or 39/100=39% utilization associated with the server 1 1002 for the example scenario of FIG. 10, and as shown with regard to FIG. 12 discussed further below.

As shown in the example of FIG. 10, the create marketing letter service 1014 and the next service send email 1016 are connected via the workload propagator 1036. The workload propagator 1036 is associated with an example attribute value of m=1, such that for every call on the create marketing letter service 1014 there will be 1 call on the send email service 1016.

As another example, as shown in the example of FIG. 10, for every invocation on the create purchase order service 1012, the workload propagator 1032 indicates that the send email service 1016 is invoked 2 times. Thus, the external invocation 1008 invokes the create purchase order service 1012 at a rate of 6 invocations per second, which causes the create purchase order 1012 to invoke the send email service 1016 at a rate of 2*6=12 invocations per second. Additionally, the external invocation 1010 invokes the create marketing letter service 1014 at a rate of 3 invocations per second, which causes the create marketing letter service 1014 to invoke the send email service 1016 at a rate of 1*3=3 invocations per second.

Each invocation of the example send email service 1016 causes m=3 invocations of the example database store service 1018 via the workload propagator edge 1034. Thus, the external invocation 1008 causes a total of 6*2*3=36 invocations per second, and the external invocation 1010 causes a total of 3*1*3=9 invocations per second, of the example database store service 1018. The example database store service 1018 is associated with a units of work attribute having a value of u=3 SAPS*s, meaning that each invocation on the example database store service 1018 exerts 3 units of work on the server 3 1006. Thus, the example external invocation 1008 causes 36*3=108 benchmark units per second to be exerted on the server 3 node 1006, and the external invocation 1010 causes 9*3=27 benchmark units per second to be exerted on the server 3 node 1006. The processing power or supply h associated with the server 3 1006 has a value of 150 benchmark units, so that the server 3 1006 may have 150−108−27=15 benchmark units per second available for other services after provisioning the database store service 1018 on the server 3 1006. Further, the utilization of the server 3 1006 may be determined as the demand (i.e., 108+27) divided by the available benchmark units (i.e., h=150), or 135/150=90% utilization associated with the server 3 1006 for the example scenario of FIG. 10, and as shown with regard to FIG. 11 discussed further below.

Figure 11:
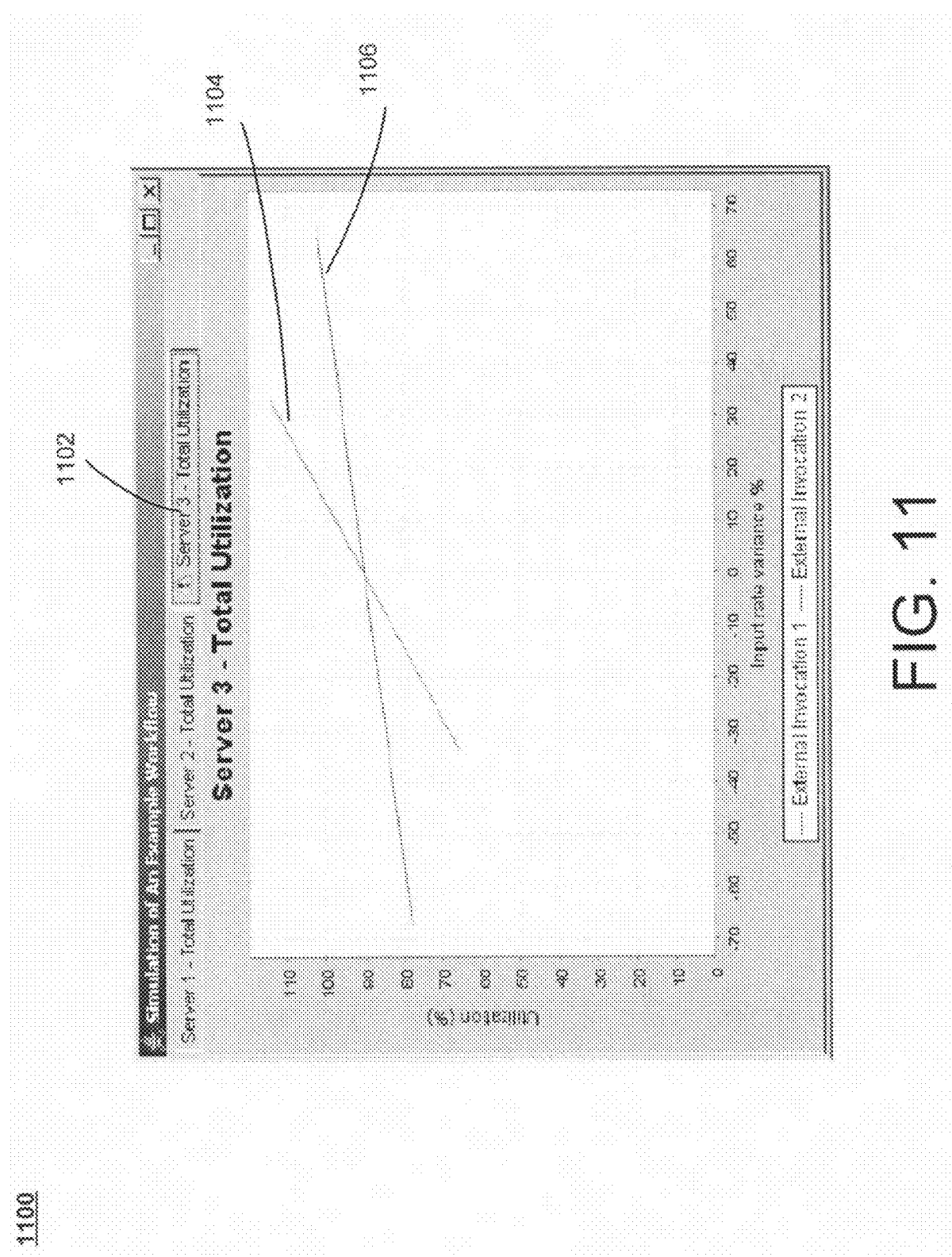
FIG. 11 depicts an example output of a model analysis according to an example embodiment.

An example output of example techniques discussed herein may include an indication of utilization of each of the hardware nodes (e.g., servers 1002, 1004, 1006) resulting from a simulation and analysis of the modeled SOA design. FIG. 11 depicts an example output of the model analysis, which displays a tab 1102 indicating the server for which is displayed two lines 1104, 1106, indicating an effect of a variance of the external invocations 1008, 1010 on utilization of the server 3 1006 according to an example embodiment. As discussed previously with regard to FIG. 10, a 90% utilization rate may be determined for the server 3 1006 based on the example model shown in FIG. 10. In order to expose the behavior under changing workloads a sensitivity analysis may be included which may indicate the change in utilization due to an example predetermined variation of the external invocation rate associated with each external invocation 1008, 1010. According to an example embodiment, the example variation may be set in the external invocation entity 308 as an absolute variance of the invocation rate r, e.g., r=6 with a variance of 2, meaning r=4 . . . 8. The displayed variance may be expressed as a relative value with respect to a mean value.

The example output may also indicate a warning, as indicated in the example tab 1102 of FIG. 11, when the utilization of the hardware is estimated as above 65% of the total capacity, since beyond this stage response times may significantly increase. As shown in FIG. 11, the warning symbol may indicate that the server 3 1006 is over-utilized because at 0% input rate variance, the server 3 1006 is utilized at over 65%.

Figure 12:
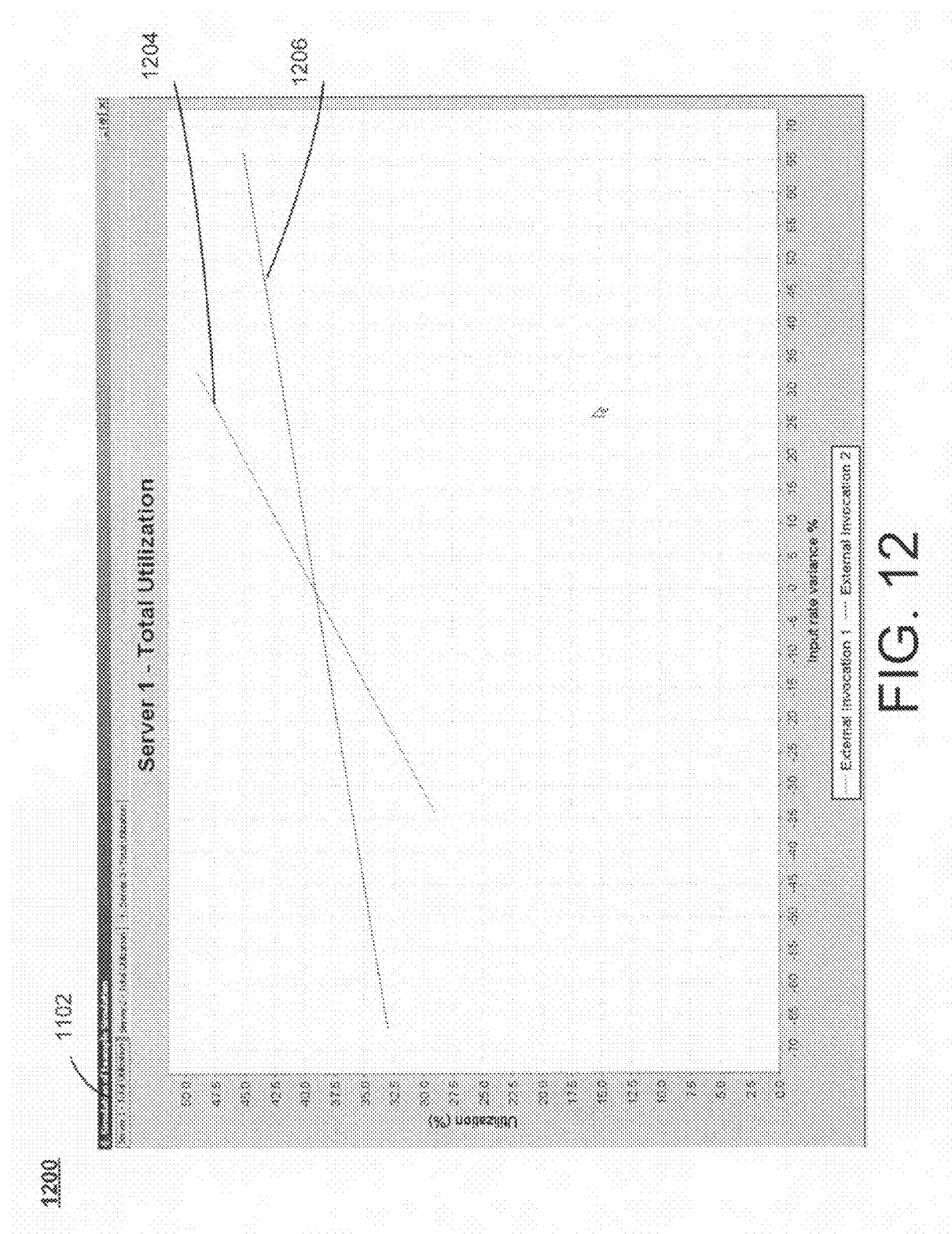
FIG. 12 depicts an example output of a model analysis according to an example embodiment.

Similarly, FIG. 12 depicts an example output of a model analysis according to an example embodiment. FIG. 12 depicts an example output of the model analysis, for which is displayed two lines 1204, 1206, indicating an effect of a variance of the external invocations 1008, 1010 on utilization of the server 1 1002 according to an example embodiment. As discussed previously with regard to FIG. 10, a 39% utilization rate may be determined for the server 1 1002 based on the example model shown in FIG. 10.

According to an example embodiment, the service, hardware and user landscapes or designs may be modeled via a graphical user interface and the landscapes or designs may then be evaluated with respect to estimating resource provisioning of SOAs.

For example, graphical entities such as those discussed previously with regard to FIGS. 4-9 may be associated graphically via a graphical user interface, based on an example graph framework, and the example interrelationships may be rendered. Example constraints may guide a user of the graphical user interface to avoid invalid decisions, for example, with regard to which entities may be connected in a model SOA or workflow.

According to an example embodiment, an example input to the simulation engine 142 may include an extraction of the graphical entities via an application programming interface (API) associated with an example graphical user interface used by the user for creating the graphical model or workflow. The simulation engine 142 may thus obtain the objects from the service, hardware and user landscapes or designs, and the associated attributes of these objects, for example the units of work attribute value associated with a service node 310. Thus, according to an example embodiment, an example "canvas designer" application on which a user may design a model may be provided separately from simulation functionality such as the simulation engine 142. However, one skilled in the art of data processing will appreciate that there are many ways to achieve the design functionality and the simulation functionality without departing from the spirit of the example techniques discussed herein.

Figure 13:
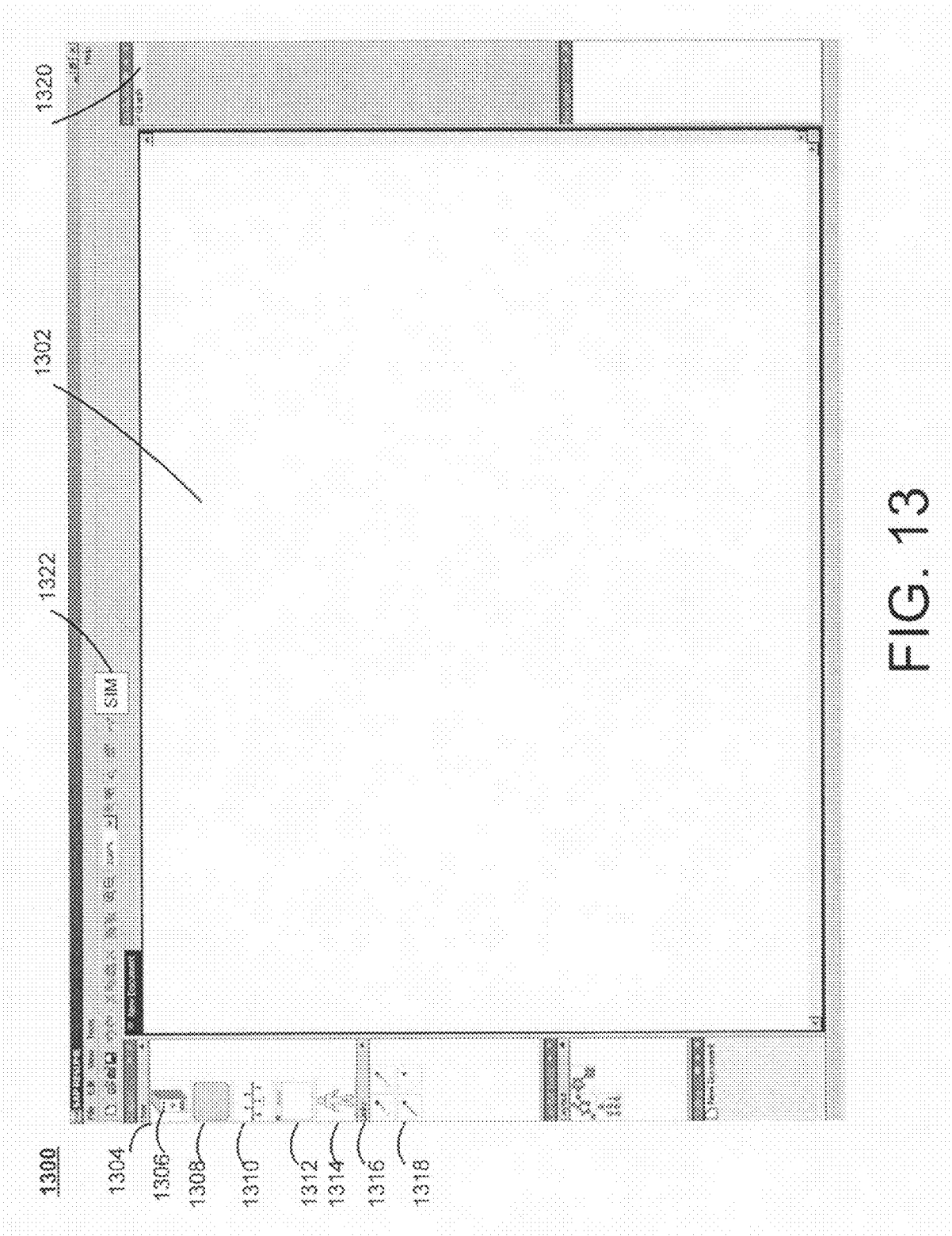
FIG. 13 is a screen shot illustrating a canvas for modeling a system design according to an example embodiment.

FIG. 13 is a screen shot illustrating display 1300 including a canvas 1302 for modeling a system design according to an example embodiment. A user of the graphical user interface thus starts with a blank canvas. The display 1300 may include a node repository area 1304 which may include a display of graphical entities such as example nodes 1306, 1308, 1310, 1312, and 1314, which may be selected by the user, and dragged and dropped onto the canvas 1302 as part of designing a model, for example, for simulation of provisioning. As shown in the example of FIG. 13, the example node 1306 may correspond to the hardware node entity 312, the example node 1312 may correspond to the service node entity 310, and the example node 1314 may correspond to the external invocation node entity 308 discussed previously.

The display 1300 may further include a link area, or edge repository area 1316, which may include a display of graphical entities such as example links or edges 1318. The example edges 1318 may be distinguished, for example, by different display colors for each different type of edge, which may include edge types corresponding to the interface connector edge 314, the provisioner edge 316, and the workload propagator edge 318 discussed previously. As discussed previously, safeguards may be included in the example modeling technique to ensure that a user of the display 1300 arranges nodes and edges in the model such that the arrangement complies with the structural descriptions of the entities as discussed, for example, with regard to FIG. 3. For example, the user may connect a service node 1312 with an external invocation node 1314 via an interface connector edge corresponding to the interface connector edge 314, but not via a provisioner edge corresponding to the provisioner edge 316.

The display 1300 further includes a graph area 1320 and a SIM button 1322 which may be selected by a user to initiate execution of a simulation of a completed model or design.

Figure 14:
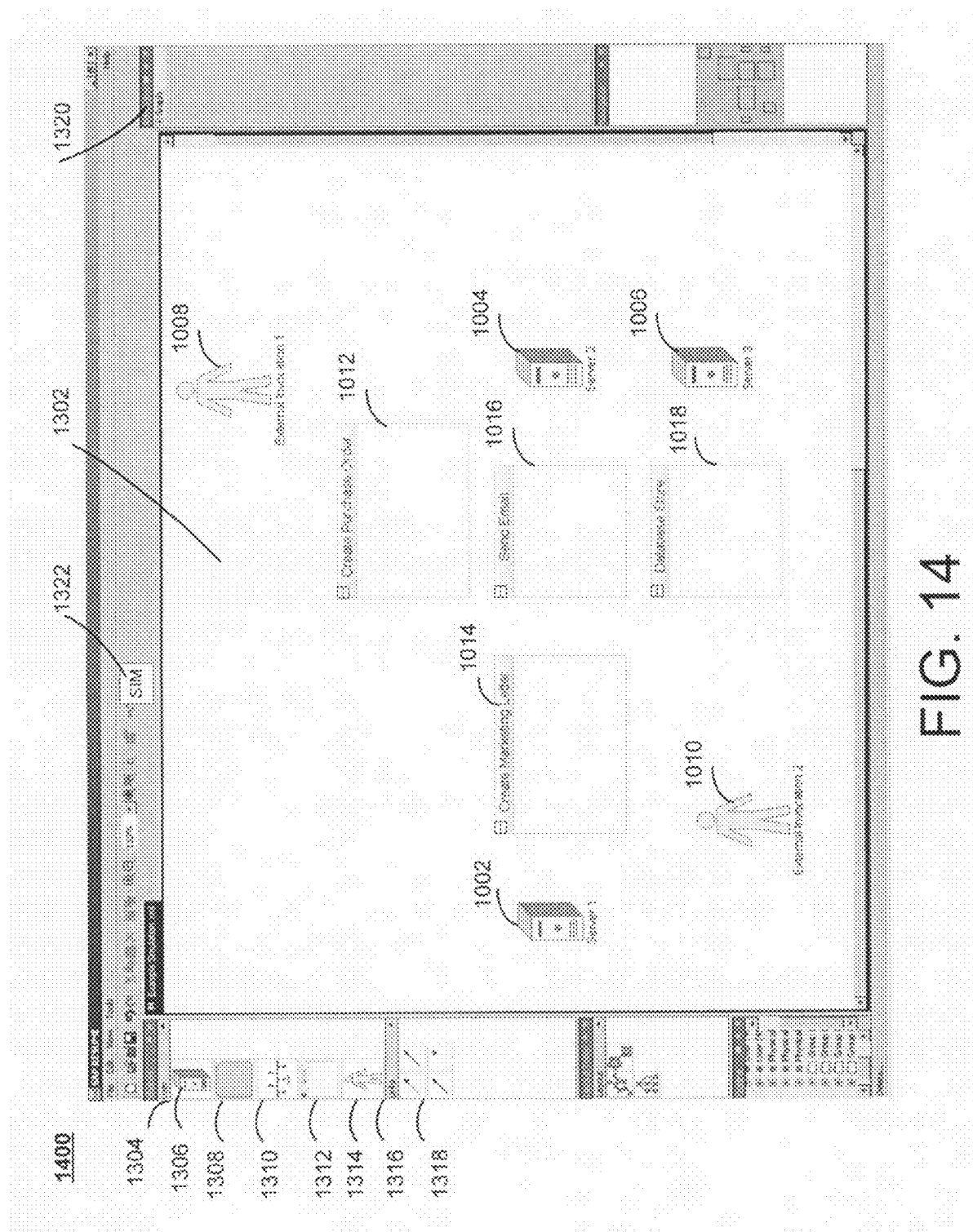
FIG. 14 is a screen shot illustrating nodes added by a user to the canvas for modeling a system design according to an example embodiment.

FIG. 14 is a screen shot illustrating nodes added by a user to the canvas for modeling a system design according to an example embodiment. According to an example embodiment, the user may drag and drop nodes such as services, external invocations and hardware nodes from the node repository area 1304 onto the canvas 1302. As shown in FIG. 14, the user has arranged the nodes similarly to the node arrangement discussed previously with regard to FIG. 10 discussed previously.

Figure 15:
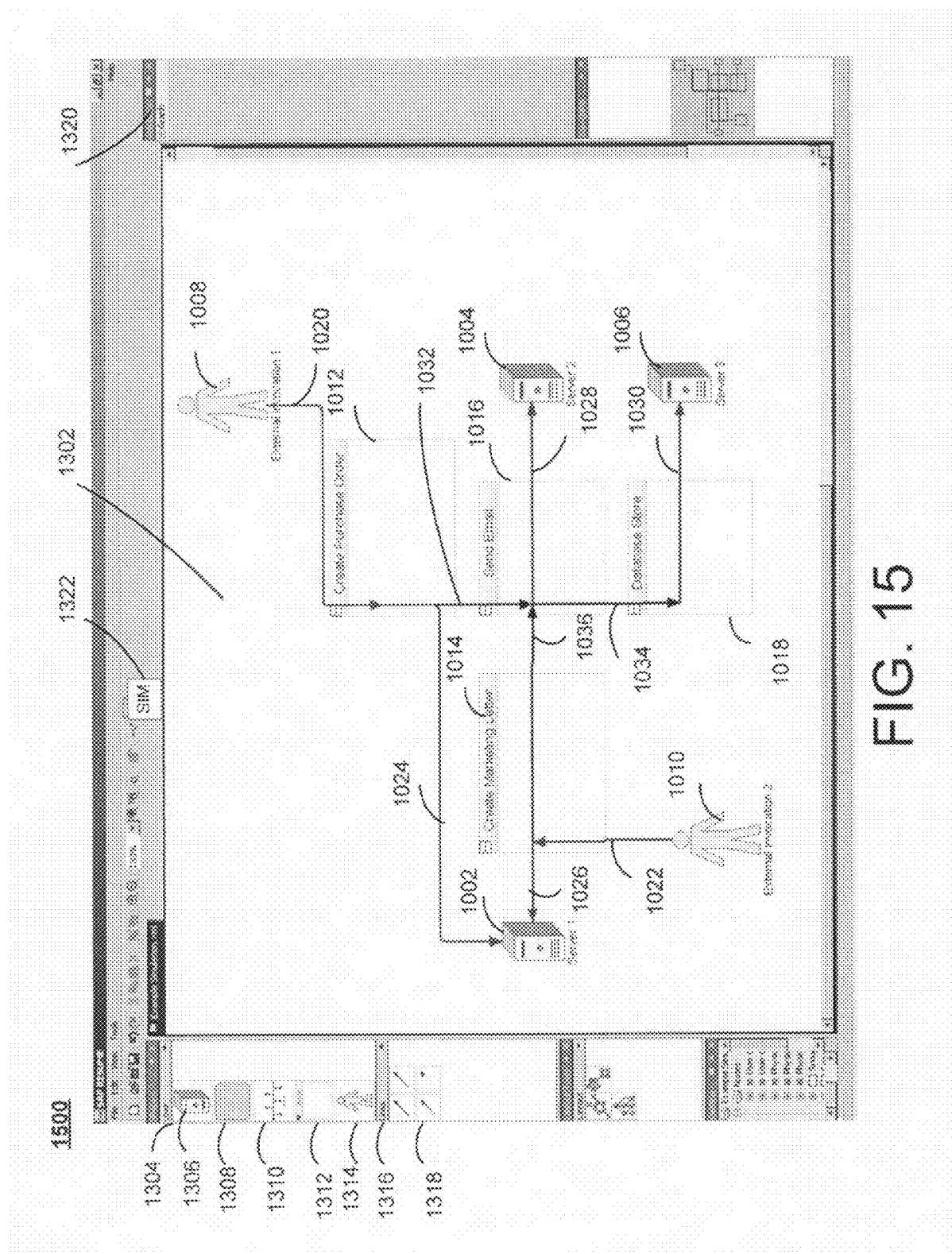
FIG. 15 is a screen shot illustrating nodes linked by a user via the canvas for modeling a system design according to an example embodiment.

FIG. 15 is a screen shot illustrating nodes linked by a user via the canvas for modeling a system design according to an example embodiment. According to an example embodiment, the user may drag and drop edges 1318 such as workload propagators 1032, 1034, interface connectors 1020, 1022, and provisioners 1024, 1026, 1028, 1030 from the edge repository 1316 to link nodes together with the edges. As shown in FIG. 14, the user has arranged the edges similarly to the edge arrangement discussed previously with regard to FIG. 10 discussed previously.

Figure 16:
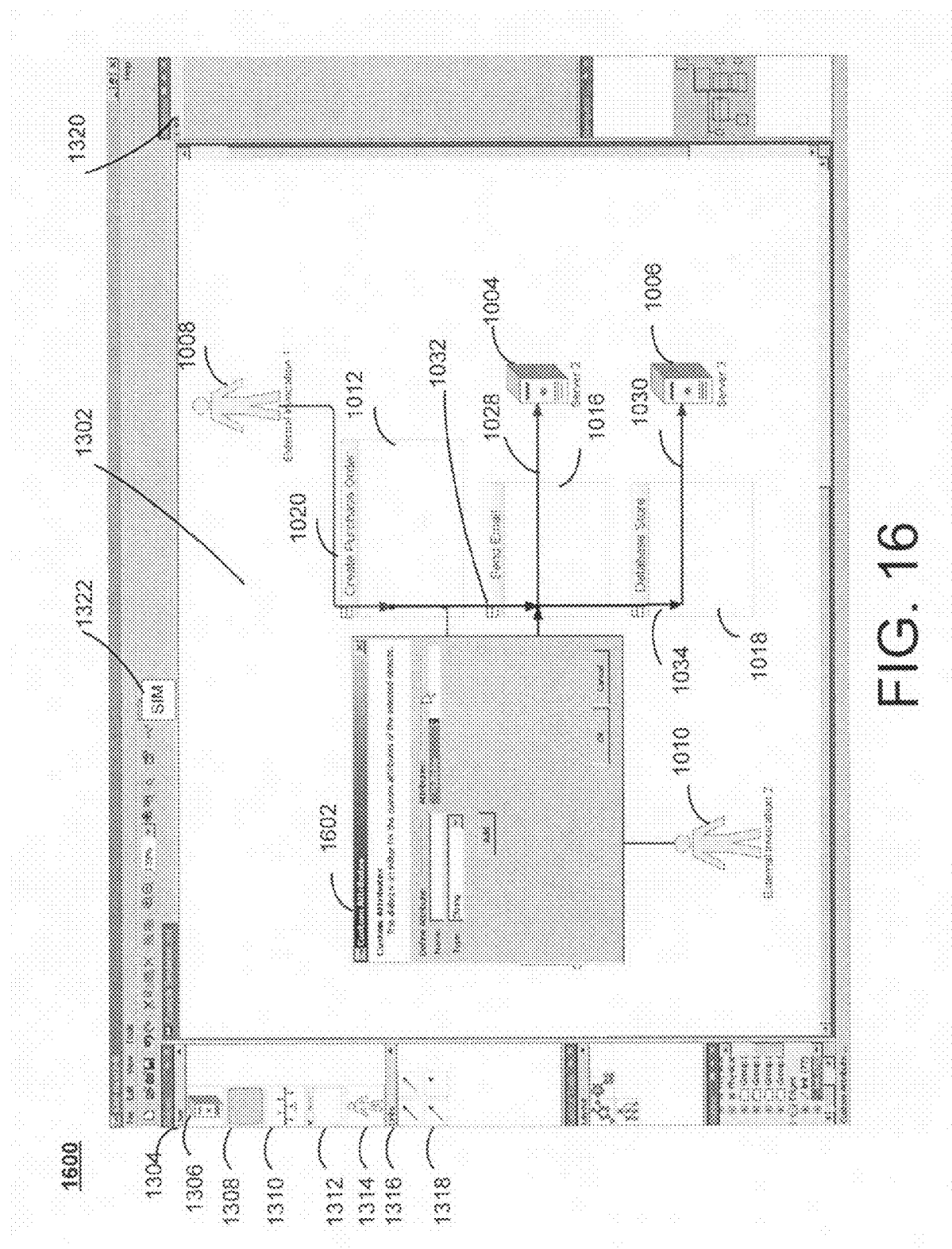
FIG. 16 is a screen shot illustrating an example dialog box for specifying custom attributes associated with an entity selected by the user according to an example embodiment.

FIG. 16 is a screen shot illustrating an example dialog box for specifying custom attributes associated with an entity selected by the user according to an example embodiment. For example, the user may select a node or edge displayed on the canvas 1302, and a pop-up custom attributes dialog screen 1602 may be provided so that the user may specify custom attributes for association, for example, with a selected service, hardware, or external invocation node, or with a selected workload propagator. For example, the custom attributes dialog screen 1602 may display an attribute name such as "multiplier" so that the user may enter a value, for example, a value of 2, for the attribute associated with a selected workload propagator displayed on the canvas 1302.

Figure 17:
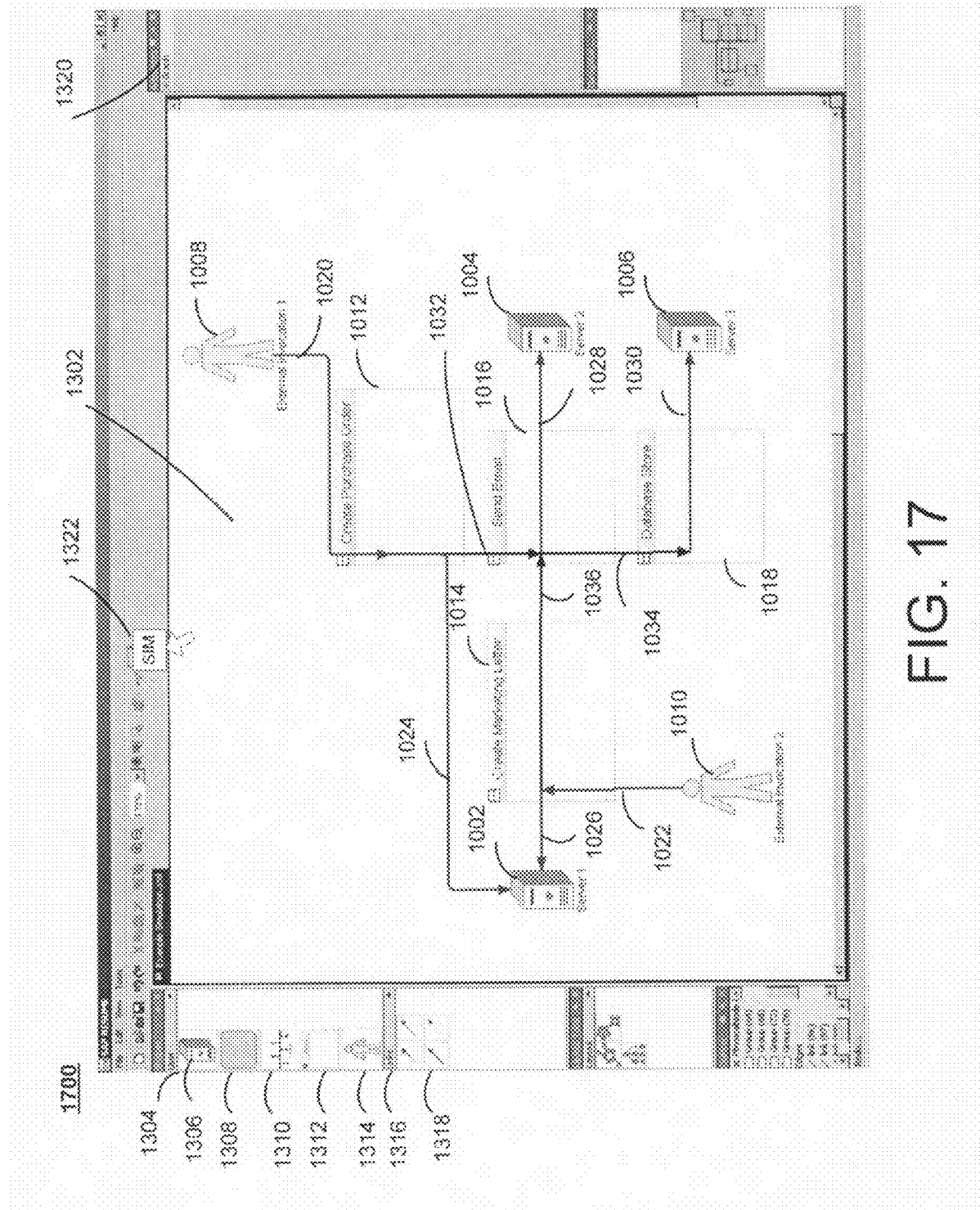
FIG. 17 is a screen shot illustrating a user selection to initiate execution of a simulation according to an example embodiment.

FIG. 17 is a screen shot illustrating a user selection to initiate execution of a simulation according to an example embodiment. When the user has completed a model or design scheme on the canvas 1302, the user may select the SIM button 1322 to initiate execution of the simulation, for example, via a call by the user interface 116 to the simulation engine 142. The simulation then proceeds to execute code to provision services to hardware nodes, and may provide results such as the example utilization results displayed in FIGS. 11 and 12 as discussed previously. According to an example embodiment, after reviewing results of the simulation, the user may revise the design and initiate the simulation again until the user decides to exit the graphical user interface display.

Figure 18:
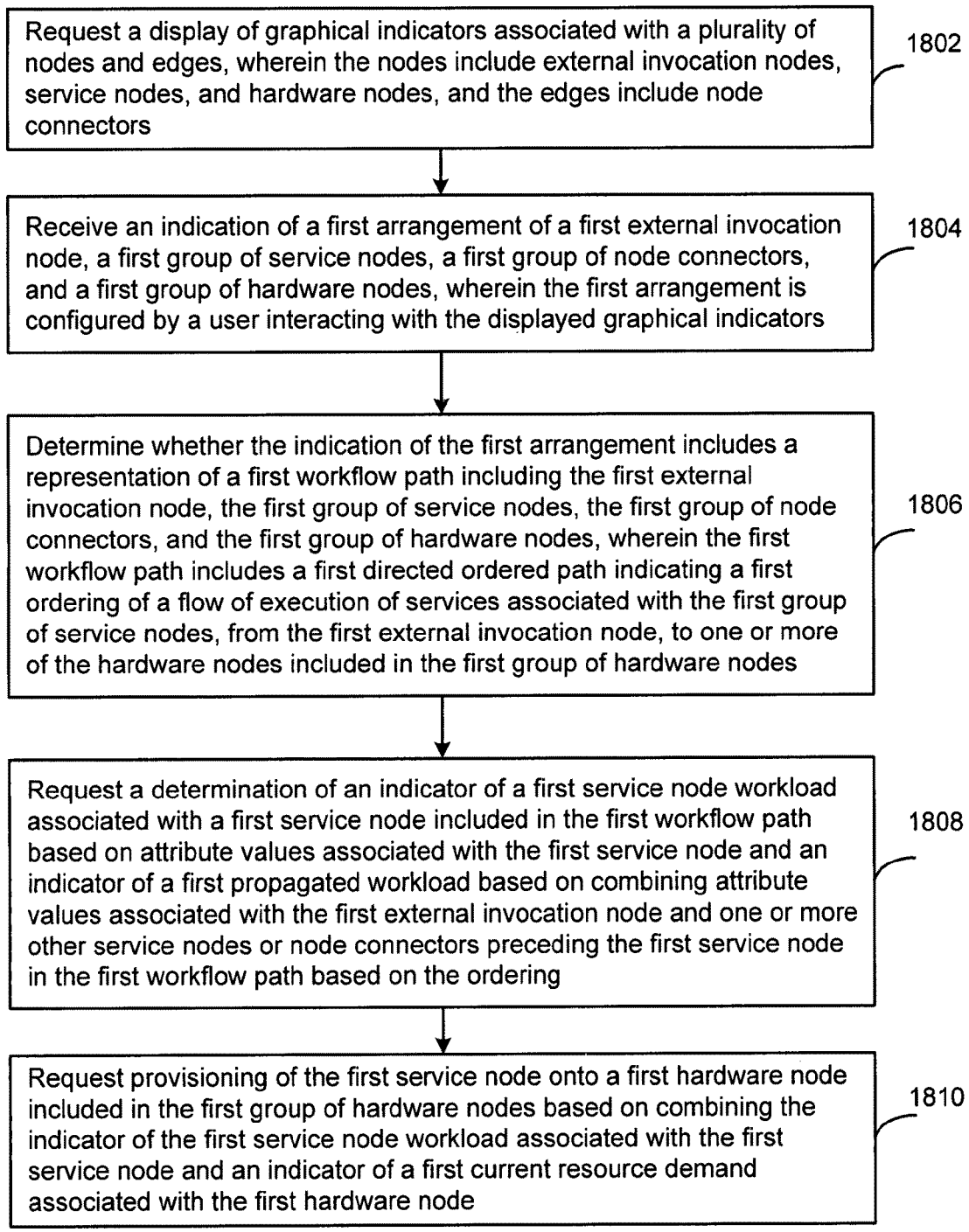
FIG. 18 is a flowchart illustrating an operation of the example system of FIG. 1.

FIG. 18 is a flowchart illustrating an operation of the example system of FIG. 1. For example, the user interface 116 may interact with the simulation engine 142 to provide the example screen views for a user such as the user 104, as discussed previously with regard to FIGS. 11-17. According to an example embodiment, a display of graphical indicators associated with a plurality of nodes and edges may be requested, wherein the nodes include external invocation nodes, service nodes, and hardware nodes, and the edges include node connectors (1802). For example, the user interface 116 may request a display of a screen including the node repository area 1304 which may include a display of graphical entities such as example nodes 1306, 1308, 1310, 1312, and 1314 and link area, or edge repository area 1316, which may include a display of graphical entities such as example links or edges 1318, as discussed previously with regard to the example of FIG. 13.

An indication of a first arrangement of a first external invocation node, a first group of service nodes, a first group of node connectors, and a first group of hardware nodes may be received, wherein the first arrangement is configured by a user interacting with the displayed graphical indicators (1804). For example, the user interface 116 may receive an indication of a first arrangement such as the example arrangement shown in the canvas area 1302 of FIG. 17 as discussed previously.

It may be determined whether the indication of the first arrangement includes a representation of a first workflow path including the first external invocation node, the first group of service nodes, the first group of node connectors, and the first group of hardware nodes, wherein the first workflow path includes a first directed ordered path indicating a first ordering of a flow of execution of services associated with the first group of service nodes, from the first external invocation node, to one or more of the hardware nodes included in the first group of hardware nodes (1806). For example, the user interface 116 may determine whether the example arrangement shown in the canvas area 1302 of FIG. 17 includes a representation of a valid workflow path as discussed previously.

A determination of an indicator of a first service node workload associated with a first service node included in the first workflow path may be requested, the determination based on attribute values associated with the first service node and an indicator of a first propagated workload based on combining attribute values associated with the first external invocation node and one or more other service nodes or node connectors preceding the first service node in the first workflow path based on the ordering (1808). For example, the user interface 116 may request that the example propagated workload engine 108 determine the indicator of the first service workload associated with the first service node, as discussed previously.

Provisioning of the first service node onto a first hardware node included in the first group of hardware nodes may be requested, the provisioning based on combining the indicator of the first service node workload associated with the first service node and an indicator of a first current resource demand associated with the first hardware node (1810). For example, the user interface 116 may request the example provisioning engine 110 to provision the first service node onto a first hardware node, as discussed previously. According to an example embodiment, the provisioning may be based on combining values associated with a rate of invocation of the first external invocation node, units of work values associated with each of the service nodes, multiplier values associated with one or more of the node connectors, and a total supply of power value associated with the one of the hardware nodes.

By using example techniques discussed herein, a SOA architect may gain insight into the demand of the services and the possible layout of the hardware landscape that is required to host all services. He may modify the system configuration in response to the results from running the analytical model. When the system configuration is to be changed the SOA architect may then be able to have an estimate of the consequences for the whole system. With this feature the required information for design decisions may advantageously be provided prior to system revisions.

The example estimator, engines, generators, managers, and interface as shown in FIG. 1 may be implemented as separate processors, or may be implemented as executable code that may be loaded and executed by a single processor. For example, the estimator, engines, generators, managers, and interface may be implemented as software objects that may be compiled and stored in a nonvolatile memory, and may be loaded into a volatile memory for execution. For example, the estimator, engines, generators, managers, and interface may also be located on separate processors that may be distributed over a network such as the Internet, and may be executed in a distributed manner when needed.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A system comprising:

a processor; and a user interface that is in communication with the processor, wherein the processor is configured to cause the user interface to:

request a display of graphical indicators associated with a plurality of nodes and edges, wherein the nodes include external invocation nodes, service nodes, and hardware nodes, and the edges include node connectors, receive an indication of a first arrangement of a first external invocation node, a first group of service nodes, a first group of node connectors, and a first group of hardware nodes, wherein the first arrangement is configured by a user interacting with the displayed graphical indicators displayed in response to the request for the display of the graphical indicators, determine whether the indication of the first arrangement includes a representation of a first workflow path including the first external invocation node, the first group of service nodes, the first group of node connectors, and the first group of hardware nodes, wherein the first workflow path includes a first directed ordered path indicating a first ordering of a flow of execution of services associated with the first group of service nodes, from the first external invocation node, to one or more hardware nodes included in the first group of hardware nodes, request a determination of an indicator of a first service node workload associated with a first service node included in the first workflow path based on attribute values associated with the first service node and an indicator of a first propagated workload based on combining attribute values associated with the first external invocation node and one or more other service nodes or node connectors preceding the first service node in the first workflow path based on the first ordering, and request provisioning of the first service node onto a first hardware node included in the first group of hardware nodes based on combining the indicator of the first service node workload associated with the first service node and an indicator of a first current resource demand associated with the first hardware node.

2. The system of claim 1, wherein the processor is configured to cause the user interface to:
receive a request for a dialog box associated with entry of a value of an attribute associated with one of the nodes or edges,
generate a display of the dialog box, and
receive the value of the attribute associated with the node or edge.

3. The system of claim 1, wherein the processor is configured to cause the user interface to receive from a user one or more of:
a value indicating a forward edge associated with one of the nodes, wherein the forward edge emanates from the first external invocation node in the first arrangement;
a value indicating a source node and a target node associated with one of the edges;
a value indicating a rate of invocation associated with one of the external invocation nodes;
a value indicating a units of work value associated with one of the service nodes;
a value indicating a total supply of power associated with one of the hardware nodes; and
a value indicating a weight or multiplier associated with one of the node connectors.

4. The system of claim 1, farther comprising:
a simulation engine in communication with the processor, wherein the processor is configured to cause the simulation engine to initiate execution of simulations of models or designs including arrangements of workflow paths,
wherein the processor is configured to cause the user interface to:
receive a request for initiation of execution of a simulation associated with the first arrangement,
send a request to the simulation engine to initiate execution of the simulation associated with the first arrangement, and
generate a display of simulation results.

5. The system of claim 4, further comprising:
a model manager in communication with the processor, wherein the processor is configured to cause the model manager to generate a directed acyclic graph that includes indicators associated with the first external invocation node, the first group of service nodes, the first group of node connectors, and the first group of hardware nodes, based on the indication of the first arrangement; and
a model repository configured to store information associated with the directed acyclic graph,
wherein the processor is configured to cause the simulation engine to initiate execution of the simulation associated with the first arrangement, based on the directed acyclic graph.

6. The system of claim 5, wherein the processor is configured to cause the simulation engine to:
initiate a traversal of the directed acyclic graph.

7. The system of claim 5, wherein the processor is configured to cause the simulation engine to:
initiate a traversal of the directed acyclic graph, the traversal based on traversing the indicators from the first external invocation node to the one or more of the hardware nodes included in the first group of hardware nodes.

8. The system of claim 5, wherein the processor is configured to cause the simulation engine to:
initiate a traversal of the directed acyclic graph, the traversal based on traversing the indicators from the first external invocation node to the one or more of the hardware nodes included in the first group of hardware nodes, and
initiate provisioning each of the first group of service nodes onto one of the hardware nodes based on combining values associated with a rate of invocation of the first external invocation node, units of work values associated with each of the service nodes, multiplier values associated with one or more of the node connectors, and a total supply of power value associated with the one of the hardware nodes.

9. The system of claim 8, wherein the processor is configured to cause the simulation engine to:
initiate determining a utilization indicator associated with one of the hardware nodes based determining a current resource demand associated with the first hardware node, based on a result of provisioning each of the first group of service nodes.

10. The system of claim 9, wherein the processor is configured to cause the user interface to:
generate a display for the user of a representation of the utilization indicator.

11. The system of claim 9, wherein the processor is configured to cause the user interface to:
generate a display for the user of a representation of the utilization indicator associated with the one of the hardware nodes based on a predetermined variance of invocation values associated with one or more of the external invocation nodes.

12. The system of claim 5, wherein the model repository comprises:
a model structure storage area configured to store information associated with the directed acyclic graph;
a node repository including:
a service storage area configured to store information associated with service nodes,
an invocation storage area configured to store information associated with invocation nodes including external invocation nodes, and
a hardware storage area configured to store information associated with hardware nodes; and
an edge repository including:
an interface connector storage area configured to store information associated with interface connector edges,
a provisioner storage area configured to store information associated with provisioner edges, and
a workload propagator storage area configured to store information associated with invocation edges.

13. A method comprising:
requesting a display of graphical indicators associated with a plurality of nodes and edges, wherein the nodes include external invocation nodes, service nodes, and hardware nodes, and the edges include node connectors;
receiving an indication of a first arrangement of a first external invocation node, a first group of service nodes, a first group of node connectors, and a first group of hardware nodes, wherein the first arrangement is configured by a user interacting with the graphical indicators displayed in response to the request for the display of the graphical indicators;
determining whether the indication of the first arrangement includes a representation of a first workflow path including the first external invocation node, the first group of service nodes, the first group of node connectors, and the first group of hardware nodes, wherein the first workflow path includes a first directed ordered path indicating a first ordering of a flow of execution of services associated with the first group of service nodes, from the first external invocation node, to one or more hardware nodes included in the first group of hardware nodes;
requesting a determination of an indicator of a first service node workload associated with a first service node included in the first workflow path based on attribute values associated with the first service node and an indicator of a first propagated workload based on combining attribute values associated with the first external invocation node and one or more other service nodes or node connectors preceding the first service node in the first workflow path based on the first ordering; and requesting provisioning of the first service node onto a first hardware node included in the first group of hardware nodes based on combining the indicator of the first service node workload associated with the first service node and an indicator of a first current resource demand associated with the first hardware node.

14. A computer program product being tangibly embodied on a computer-readable medium and being configured to cause a data processing apparatus to:

request a display of graphical indicators associated with a plurality of nodes and edges, wherein the nodes include external invocation nodes, service nodes, and hardware nodes, and the edges include node connectors, receive an indication of a first arrangement of a first external invocation node, a first group of service nodes, a first group of node connectors, and a first group of hardware nodes, wherein the first arrangement is configured by a user interacting with the graphical indicators displayed in response to the request for the display of the graphical indicators, determine whether the indication of the first arrangement includes a representation of a first workflow path including the first external invocation node, the first group of service nodes, the first group of node connectors, and the first group of hardware nodes, wherein the first workflow path includes a first directed ordered path indicating a first ordering of a flow of execution of services associated with the first group of service nodes, from the first external invocation node, to one or more hardware nodes included in the first group of hardware nodes, request a determination of an indicator of a first service node workload associated with a first service node included in the first workflow path based on attribute values associated with the first service node and an indicator of a first propagated workload based on combining attribute values associated with the first external invocation node and one or more other service nodes or node connectors preceding the first service node in the first workflow path based on the first ordering, and request provisioning the first service node onto a first hardware node included in the first group of hardware nodes based on combining the indicator of the first service node workload associated with the first service node and an indicator of a first current resource demand associated with the first hardware node.

15. The computer program product of claim 14, further configured to cause the data processing apparatus to:

receive a request for a dialog box associated with entry of a value of an attribute associated with one of the nodes or edges, generate a display of the dialog box, and receive the value of the attribute associated with the node or edge.

16. The computer program product of claim 15, further configured to cause the data processing apparatus to receive from a user one or more of:

a value indicating a forward edge associated with one of the nodes, wherein the forward edge emanates from the first external invocation node in the first arrangement;

a value indicating a source node and a target node associated with one of the edges;

a value indicating a rate of invocation associated with one of the external invocation nodes;

a value indicating a units of work value associated with one of the service nodes;

a value indicating a total supply of power associated with one of the hardware nodes; and a value indicating a weight or multiplier associated with one of the node connectors for each one of the hardware nodes included in the model, determine a utilization indicator associated with each one of the hardware nodes based on traversing all workflow paths included in the model that include each one of the hardware nodes.

17. The computer program product of claim 15, further configured to cause the data processing apparatus to:

initiate execution of simulations of models or designs including arrangements of workflow paths, receive a request for initiation of execution of a simulation associated with the first arrangement, send a request to initiate execution of the simulation associated with the first arrangement, and generate a display of simulation results.

18. The computer program product of claim 17, further configured to cause the data processing apparatus to:

generate a directed acyclic graph that includes indicators associated with the first external invocation node, the first group of service nodes, the first group of node connectors, and the first group of hardware nodes, based on the indication of the first arrangement; and store information associated with the directed acyclic graph, wherein execution of the simulation associated with the first arrangement is initiated based on the directed acyclic graph.

19. The computer program product of claim 18, further configured to cause the data processing apparatus to:

initiate a traversal of the directed acyclic graph, the traversal based on traversing the indicators from the first external invocation node to the one or more of the hardware nodes included in the first group of hardware nodes.

20. The computer program product of claim 18, further configured to cause the data processing apparatus to:

initiate a traversal of the directed acyclic graph, the traversal based on traversing the indicators from the first external invocation node to the one or more of the hardware nodes included in the first group of hardware nodes, and initiate provisioning each of the first group of service nodes onto one of the hardware nodes based on combining values associated with a rate of invocation of the first external invocation node, units of work values associated with each of the service nodes, multiplier values associated with one or more of the node connectors, and a total supply of power value associated with the one of the hardware nodes.

21. The computer program product of claim 20, further configured to cause the data processing apparatus to:

initiate determining a utilization indicator associated with one of the hardware nodes based determining a current resource demand associated with the first hardware node, based on a result of provisioning each of the first group of service nodes, and generate a display for the user of a representation of the utilization indicator associated with the one of the hardware nodes based on a predetermined variance of invocation values associated with one or more of the external invocation nodes.

* * * * *